United States Patent
Suzuki

(10) Patent No.: US 6,561,906 B2
(45) Date of Patent: May 13, 2003

(54) GAME APPARATUS, METHOD OF REPRODUCING MOVIE IMAGES AND RECORDING MEDIUM RECORDING PROGRAM THEREOF

(75) Inventor: Akira Suzuki, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/538,722

(22) Filed: Mar. 30, 2000

(65) Prior Publication Data

US 2003/0054882 A1 Mar. 20, 2003

(30) Foreign Application Priority Data

Apr. 30, 1999 (JP) .......................................... 11-123528

(51) Int. Cl.$^7$ ................................................ A63F 13/00
(52) U.S. Cl. ....................................................... 463/31
(58) Field of Search ............................... 463/30, 31, 32, 463/33, 43, 44; 345/114, 116, 121

(56) References Cited

U.S. PATENT DOCUMENTS

| | | | | |
|---|---|---|---|---|
| 4,890,833 A | * | 1/1990 | Lantz et al. | 273/1 E |
| 5,751,887 A | * | 5/1998 | Nitta et al. | 386/68 |
| 5,830,066 A | * | 11/1998 | Goden et al. | 463/33 |

FOREIGN PATENT DOCUMENTS

| | | | | |
|---|---|---|---|---|
| JP | 5-334374 | 12/1993 | | |
| JP | 6-75833 | 3/1994 | | |
| JP | 6-205365 | 7/1994 | | |
| JP | 7-226917 | 8/1995 | | |
| JP | 7-264542 | 10/1995 | | |
| JP | 8-223534 | 8/1996 | | |
| JP | 8-265703 | 10/1996 | | |
| JP | 9-2006679 | 7/1997 | | |
| JP | 11-53572 A | * | 2/1999 | G06T/13/00 |
| JP | 11-098513 A | * | 4/1999 | H04N/7/32 |
| JP | 10-216358 | 8/1999 | | |
| JP | 2000-135375 | 5/2000 | | |

OTHER PUBLICATIONS

English Language Abstract of JP 2000–135375.
English Language Abstract of JP 10–216358.
English Language Abstract of JP 9–200679.
English Language Abstract of JP 8–265703.
English Language Abstract of JP 8–223534.
English Language Abstract of JP 7–264542.
English Language Abstract of JP 7–226917.
English Language Abstract of JP 6–75833.
English Language Abstract of JP 6–205365.
English Language Abstract of JP 5–334374.
English Language Abstract of JP 09–200679.

* cited by examiner

Primary Examiner—Valencia Martin-Wallace
Assistant Examiner—Julie Brocketti
(74) Attorney, Agent, or Firm—Greenblum & Bernstein, P.L.C.

(57) ABSTRACT

The present invention is based on a process comprising the steps of previously recording movie data 212b and 212c in a CD-ROM in correspondence to streams of changes in depiction of a displayed image, detecting what stream a change in depiction is in response to a manual input made by the player, reading out movie data corresponding to the detected stream of changes in depiction from the CD-ROM, and causing a change in the image in display on the basis of the thus read-out movie data.

19 Claims, 21 Drawing Sheets

FIG. 12A

| ROAD 1 FRAME NO. nh | VIEW POINT COORDINATES | ANGLE |
|---|---|---|
| 1 | $(X_1, Y_1, Z_1)$ | $\theta_1$ |
| 2 | $(X_2, Y_2, Z_2)$ | $\theta_2$ |
| ⋮ | ⋮ | ⋮ |
| N | $(X_N, Y_N, Z_N)$ | $\theta_N$ |

FIG. 12B

| ROAD 1 FRAME NO. nv | VIEW POINT COORDINATES | ANGLE |
|---|---|---|
| 1 | $(X_1, Y_1, Z_1)$ | $\theta_1$ |
| 2 | $(X_2, Y_2, Z_2)$ | $\theta_2$ |
| ⋮ | ⋮ | ⋮ |
| M | $(X_M, Y_M, Z_M)$ | $\theta_M$ |

FIG. 12C

| ROAD 1 FRAME NO. nw | VIEW POINT COORDINATES | ANGLE |
|---|---|---|
| 1 | $(X_1, Y_1, Z_1)$ | $\theta_1$ |
| 2 | $(X_2, Y_2, Z_2)$ | $\theta_2$ |
| ⋮ | ⋮ | ⋮ |
| L | $(X_L, Y_L, Z_L)$ | $\theta_L$ |

| AREA | REFERENCE POINT | RANGE ($\Delta\alpha i$) | FRAME NO. |
|---|---|---|---|
| $A_{11}$ | $(X_{11}, Y_{11}, Z_{11})$ | $Y_{11-\alpha 1} \sim Y_{11+\alpha 1}$ | 1 |
| $A_{12}$ | $(X_{12}, Y_{12}, Z_{12})$ | $Y_{12-\alpha 2} \sim Y_{12+\alpha 2}$ | 2 |
| $A_{13}$ | $(X_{13}, Y_{13}, Z_{13})$ | $Y_{13-\alpha 3} \sim Y_{13+\alpha 3}$ | 3 |
| ⋮ | ⋮ | ⋮ | ⋮ |
| $A_{1N}$ | $(X_{1N}, Y_{1N}, Z_{1N})$ | $Y_{1N-\alpha N} \sim Y_{1N+\alpha N}$ | N |

| AREA | REFERENCE POINT | RANGE ($\Delta\beta i$) | FRAME NO. |
|---|---|---|---|
| $A_{21}$ | $(X_{21}, Y_{21}, Z_{21})$ | $Y_{21-\beta 1} \sim Y_{21+\beta 1}$ | 1 |
| $A_{22}$ | $(X_{22}, Y_{22}, Z_{22})$ | $Y_{22-\beta 2} \sim Y_{22+\beta 2}$ | 2 |
| $A_{23}$ | $(X_{23}, Y_{23}, Z_{23})$ | $Y_{23-\beta 3} \sim Y_{23+\beta 3}$ | 3 |
| ⋮ | ⋮ | ⋮ | ⋮ |
| $A_{2M}$ | $(X_{2M}, Y_{2M}, Z_{2M})$ | $Y_{2M-\beta M} \sim Y_{2M+\beta M}$ | M |

| AREA | REFERENCE POINT | RANGE ($\Delta\gamma i$) | FRAME NO. |
|---|---|---|---|
| $A_{31}$ | $(X_{31}, Y_{31}, Z_{31})$ | $Y_{31-\gamma 1} \sim Y_{31+\gamma 1}$ | 1 |
| $A_{32}$ | $(X_{32}, Y_{32}, Z_{32})$ | $Y_{32-\gamma 2} \sim Y_{32+\gamma 2}$ | 2 |
| $A_{33}$ | $(X_{33}, Y_{33}, Z_{33})$ | $Y_{33-\gamma 3} \sim Y_{33+\gamma 3}$ | 3 |
| ⋮ | ⋮ | ⋮ | ⋮ |
| $A_{3L}$ | $(X_{3L}, Y_{3L}, Z_{3L})$ | $Y_{3L-\gamma L} \sim Y_{3L+\gamma L}$ | L |

GAME APPARATUS, METHOD OF REPRODUCING MOVIE IMAGES AND RECORDING MEDIUM RECORDING PROGRAM THEREOF

BACKGROUND OF THE INVENTION

1. Field of the Invention

The present invention relates to a game apparatus displaying movie images during a game, a method of reproducing movie images, and a recording medium storing a program thereof. More particularly, the invention relates to a movie image reproducing technique permitting control of a change in depiction during game play.

2. Description of the Related Art

Along with the recent progress of the computer graphics technology, image processing in a TV game apparatus or the like is remarkably rising in importance for increasing the commercial value of products. Particularly, some recent games incorporate movie reproduction in the game, and are commanding general popularity as a result of high quality images.

The term "movie reproduction" as used herein means sequential reproduction for display of movie image data (hereinafter simply referred to as "movie data") comprising a collection of 2-D images (frame images) changing little by little. Movie reproduction provides a player of a game with images of a very high image quality.

For example, there is available a game in which backgrounds in the game are displayed by the use of movie data to achieve a higher quality of displayed images. In such a game, in which characters (moving objects) move in multiple directions in a virtual space in response to manual input from the player, it is necessary to interactively change movie images serving as background images relative to the directions in which the characters move.

As a conventional technique for interactively causing a change in a movie image, for example, Japanese Unexamined Patent Publication No. 9-200679 discloses a rotary disk type information recorder. The disclosed recorder has a configuration based on a process comprising the steps of previously recording multiple kinds of movie data on both sides of a rotary disk type optical disk such as a CD-ROM, providing special optical heads on the surface and the back, respectively, of the optical disk, and reading out the movie data while switching over the movie data between the surface and the back of the optical disk by changing over the optical head to become valid.

However, a general home game apparatus comprises only one optical head, and only movie data recorded on one side of the optical disk serving as a recording medium can be read out. Consequently, it may be difficult to interactively change movie reproduction while keeping pace with the progress of the game. Thus, there is a demand for a technique permitting easy achievement of interactive changes in movie images.

SUMMARY OF THE INVENTION

The present invention therefore has an object to provide a game apparatus permitting easy interactive change in the stream of changes in movie images while matching the progress of the game, a method of reproducing a movie image, and a recording medium storing a program thereof.

To achieve the aforementioned object, the game apparatus of the present invention comprises a computer which controls a game, and a recording medium which stores movie image data and a computer program that controls the computer. The movie image data includes multiple streams, each stream corresponding to a direction of movement. The apparatus also includes an input device that detects a desired direction of movement based upon manual input, and a drive that reads image data from one of the plurality of streams corresponding to the desired direction of movement. The apparatus further includes a display that displays a series of images in accordance with the read image data. The displayed series of images changes when a new desired direction of movement is detected.

According to the invention, it is possible to control the stream changing depiction of the displayed image, for example, by switching over a stream changing depiction of a displayed image to another, in response to a manual input made by the player.

According to another aspect, the present invention provides a method of reproducing a movie image in a video game. The method includes detecting a desired direction of movement based upon manual input, and reading movie image data, corresponding to the desired direction of movement, from a plurality of streams of movie image data, each stream recorded in association with a direction of movement. The method also includes changing the displayed movie image in accordance with the read movie image data. Consequently, the displayed movie image changes when a new desired direction of movement is detected.

According to another aspect of the present invention, a method of reproducing a movie image in a video game of the invention comprises detecting a stream changing depiction of a displayed image in response to a manual input made by a player; reading out movie image data corresponding to the detected stream changing depiction of the displayed image from movie image data recorded in correlation with each stream changing the displayed image; and changing the displayed image on the basis of the read-out movie image data.

By causing the computer to execute processing as described above, it is possible to obtain advantages similar to those available with the aforementioned game apparatus. Therefore, by executing the described processes by the use of hardware such as a computer, the game technique of the invention is easily applicable with such hardware.

According to the invention, there is almost no time lag between detection of the stream changing depiction of the displayed image and a change in the displayed image. It is therefore possible to achieve a natural movie reproduction.

In the aforementioned invention, the movie image corresponding to a first stream of a change in depiction may be recorded in pair with movie image data corresponding to a second stream changing depiction. In this case, a change in depiction of a stream and another change in depiction of a counter stream can be movie-reproduced.

According to the invention, it is possible to express a reversible change in depiction by conducting reproduction while switching over between the movie image data corresponding to the first stream and the movie image data corresponding to the second stream at any timing.

In the invention, the movie image data may be recorded on one side of an optical disk. In this case, it is possible to movie-reproduce a change in depiction of a stream and another change in depiction of a counter stream in a state in which a general optical disk storing data only on one side thereof is rotated only in one direction.

In the invention, the movie image data may be for reproducing a background image. In this case, it is possible to movie-reproduce background images in a game in a TV game apparatus or the like using an optical disk having a general configuration as a recording medium, thus making it possible to provide a game of a high image quality.

According to the invention, in which the background images are movie-reproduced along with move of an object of operation such as a character in game, it is possible to provide a game of a high image quality.

According to the invention, in which the view point is switched over in response to the stream of changes in depiction of the displayed image, the object of operation appears in a natural way relative to the background.

Further, in the invention, the movie image data may be for reproducing the process of series of changes in an object to be displayed with a changing manner. In this case, the manner of change in the object of display can be movie-reproduced.

According to the recording medium of the invention, the recording medium records a program for controlling display on display means of a computer wherein the recording medium records movie image data correlated with each stream changing depiction of a displayed image, and a program for reproducing a movie image; and the program causes the computer to detect the stream changing depiction of the displayed image in response to a manual input made by a player; to read out the movie image data corresponding to the stream changing depiction of the detected displayed image from among the recorded movie image data recorded in correspondence with each stream changing depiction of the displayed image; and to cause a change in the displayed image on the basis of the read-out movie image data.

The aforementioned method of reproducing a movie image of the invention can be achieved by the program recorded on the recording medium causing the computer to execute the above-mentioned steps. It is therefore possible to easily distribute and sell it as a software-product independently of the apparatus by means of the recording medium. The game technique of the invention can thus easily be materialized with these pieces of hardware by using this software product on hardware such as a computer.

The computer-readable recording medium of the invention has, on a recording surface, a first recording area which stores first movie image data for reproducing a stream changing a depiction in an array capable of being sequentially read out by a computer, and a second recording area which stores second movies image data in a data array reverse to that of the first movie image data, in an array capable of being sequentially read out by the computer.

According to the invention, it is possible to movie-reproduce a change in depiction of a stream and another change in depiction of a counter stream in a state in which a general optical disk storing data only on one side thereof is rotated only in one direction.

BRIEF DESCRIPTION OF THE DRAWINGS

FIGS. 12A–12C are tables illustrating the data structure of the view point information table in accordance with embodiment 2;

FIGS. 18A–18C are tables illustrating the data structure of the area table in accordance with embodiment 2;

DESCRIPTION OF THE PREFERRED EMBODIMENTS

Embodiments of the present invention will now be described in detail with reference to the drawings. The following description will cover a case where the game apparatus of the invention is applied to a home game apparatus.

Embodiment 1

Figure 1:
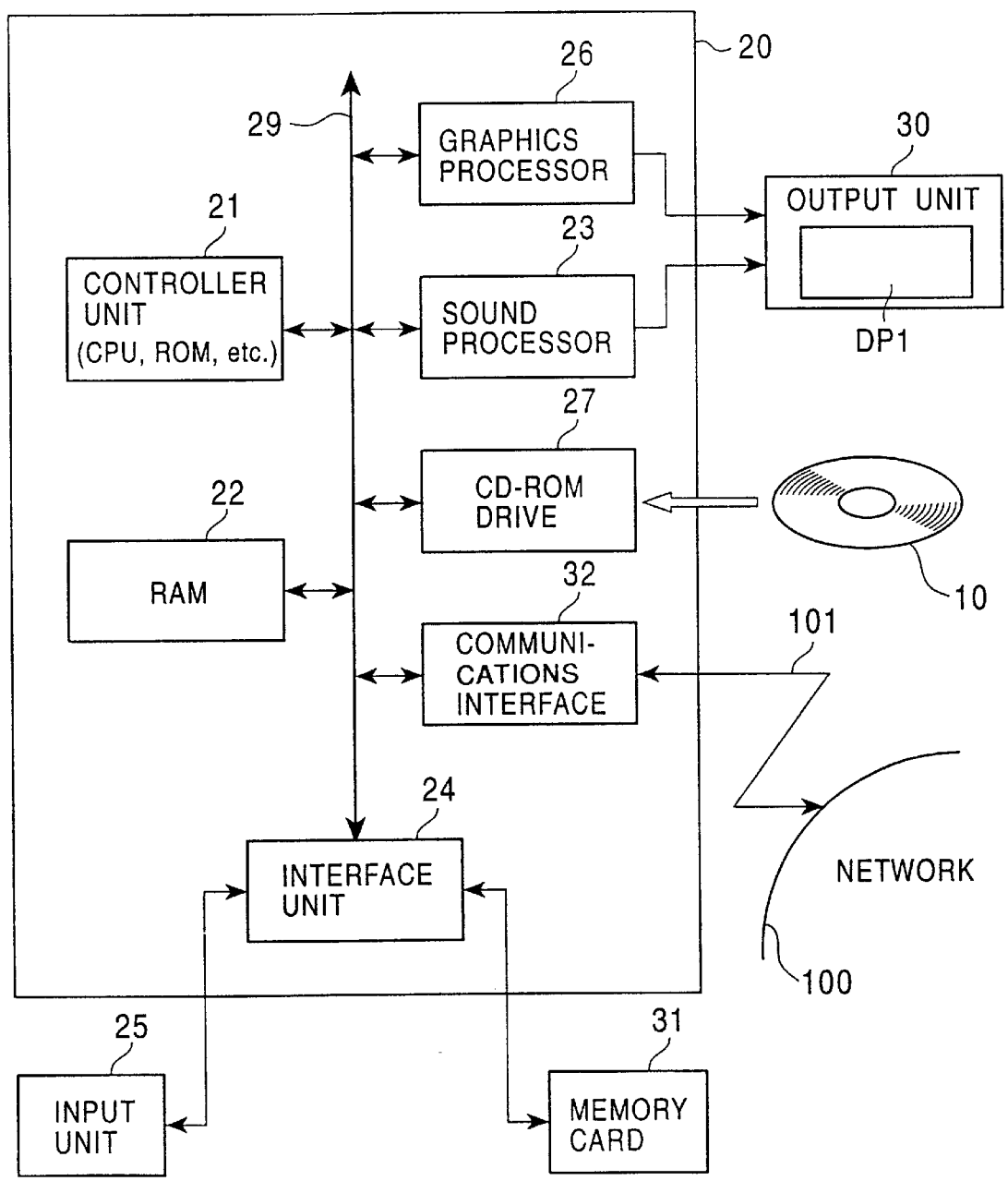
FIG. 1 is a block diagram illustrating an exemplary hardware configuration of the game system of embodiment 1 to which the game apparatus of the present invention is applied.

First, the hardware configuration of a game system to which the game apparatus of the invention is applied will be described. FIG. 1 is a block diagram illustrating the hardware configuration. In FIG. 1, the game system comprises, for example, a game apparatus 20 having main functions, an input unit 25 for entering an operating instruction for the game apparatus 20, a detachable memory card 31 for storing save data such as game progress data and game environment setting data, and an output unit 30 such as a TV set for outputting a video image and sound on the basis of a video signal and an audio signal from the game apparatus. When the game apparatus 20 in connected to a network 100 via a cable or wireless communications line 101 as shown in FIG. 1, these communications line 101 and network 100 are also constituent elements of the game system of this embodiment.

The game apparatus 20 comprises, for example, a controller unit 21, an RAM (random access memory) 22 serving as a main memory, an audio processor 23, an interface unit 24, a graphics processor 26, a CD-ROM drive 27, a recording medium such as detachable CD-ROM 10 storing a game program and various setting data and a communications interface 32 mutually connected via a bus 29. The controller unit 21 is a circuit comprising a CPU (central processing unit) and an ROM (read only memory): the CPU controls the individual parts in accordance with a program stored in the RAM 22 (or the ROM as required).

The audio processor 23 is a circuit having a function of generating music or sound with effects, and under control by the controller unit 21, generates an audio signal in response to data stored in the RAM 22, and outputs it to the output unit 30. The graphics processor 26 is a circuit provided with a frame buffer comprising a video RAM (VRAM) and draws an image (polygons) in response to a command from the controller unit 21 on the frame buffer. The graphics processor 26 generates a video signal in response to image information stored in the frame buffer, and outputs the video signal to the output unit 30. The term "polygon" as used herein means a plane of the minimum unit composing the surface of an object arranged in a 3-D space. Examples of polygons include triangles and rectangles.

The graphics processor 26 generates, more specifically, 2-D projected images of a virtual world by applying texture pattern data onto polygons forming 3-D objects such as characters or articles arranged in a virtual 3-D space. The graphics processor 26 then perspectively transforms and projects the 3-D objects onto a projection plane and executes hidden surface removal processing to the game world (virtual world) built with these three-dimensional objects, and stores them in the frame buffer. When a background image is provided at this point, images are synthesized by overwriting the 2-D projected images on the background image.

The interface unit 24 is a circuit having a configuration in which it is connected to the input unit 25 with, for example, a cable and the memory card is detachable therefrom. The interface unit 24 also performs timing control of data transfer between a circuit connected to the bus 29 (mainly the controller unit 21) and the input unit 25 or the memory card 31. The communications interface 32 is a circuit for data exchange with the other units on the network 100, and is connected to the network 100 through the communications line 101, as necessary. The CD-ROM drive 27 is a reading unit of the CD-ROM 10. Reproduction of a movie image, described later, is accomplished by causing the controller unit 21 to perform control in accordance with a movie image reproducing program recorded in the CD-ROM 10.

The input unit 25 is known also as a controller or an operating pad and is provided with direction buttons for indicating four directions (up and down, and right and left) and a joystick. In a usual game, players operating these direction buttons or the joystick causes a change in the coordinate data of a character within the virtual space, thus allowing the character to move. That is, the direction buttons or the joystick of the input unit 25 may sometimes be used for moving a character, for example, within a virtual space.

Figure 2:
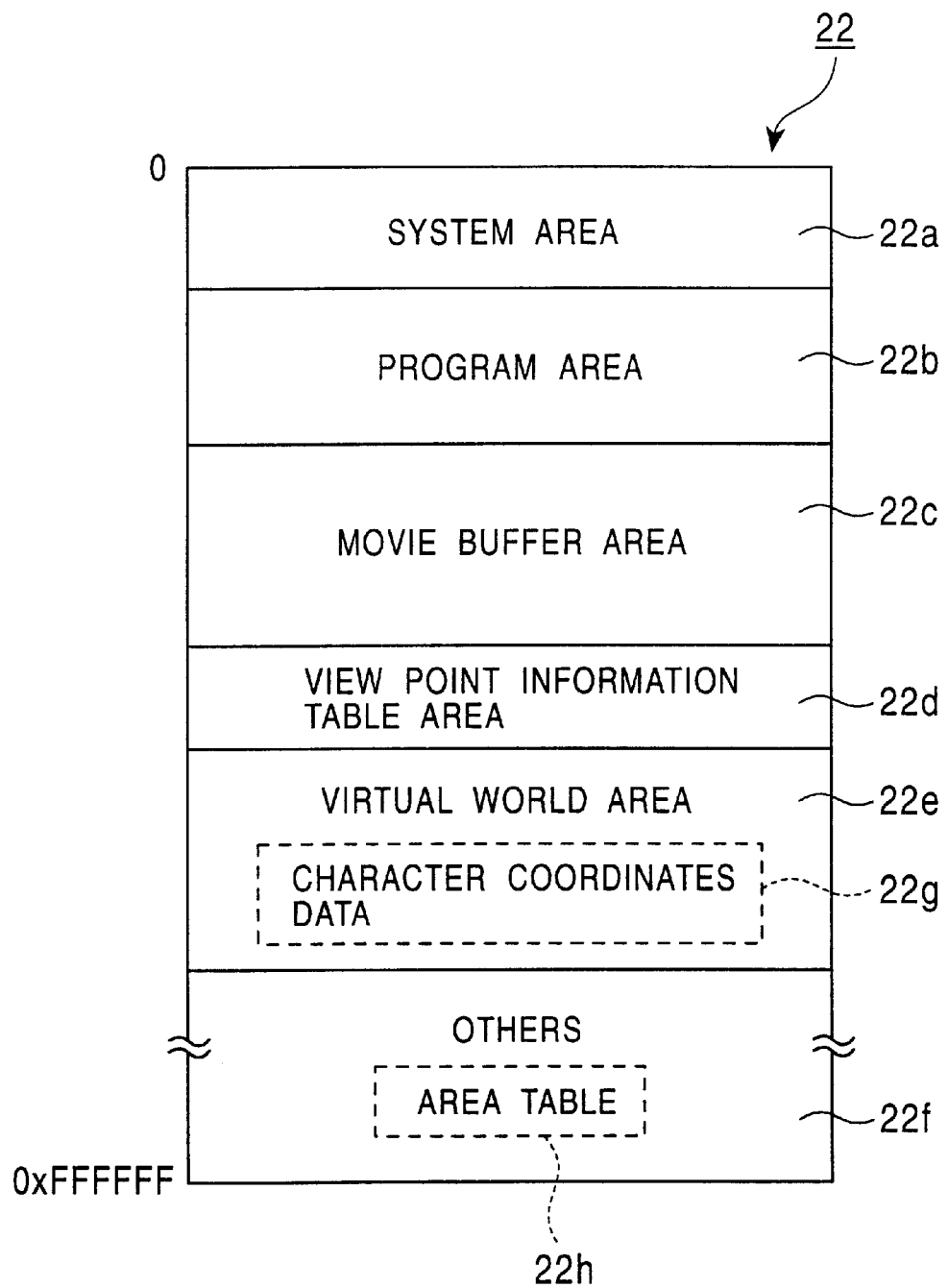
FIG. 2 is an exemplary map illustrating an area configuration of the main memory into which a program and various data are read in embodiment 1 of the invention.

FIG. 2 shows a memory map illustrating an exemplary area configuration of the RAM 22 in a state in which a program and various data are read in from the CD-ROM 10. The RAM 22 has a system area 22a, a program area 22b, a movie buffer area 22c, a visual point table area 22d, a virtual world area 22e and another area 22f.

The system area 22a stores system information such as an interrupt vector showing a jump destination to an interrupt handler. The program area 22b stores a game program comprising instruction sets for game processing and drawing instruction sets for drawing an image on a screen of the output unit 30. The movie buffer area 22c serves as a work area for loading movie data used as an background image from the CD-ROM 10 or for extending such movie data. The view point information table area 22d stores a view point information table previously storing view point information (position of the view point in a virtual 3-D space, and an angle between the screen for projection and the line of vision) used when converting the virtual world into a 2-D image (perspectively transforming and projecting a 3-D object onto a projection plane), in correspondence with individual frame images composing movie data. The view point information table will be described later.

The virtual world area 22e stores arrangement positions of all 3-D objects forming the virtual world in the respective virtual 3-D spaces and modeling data thereof. Coordinate data 22g of characters appearing in the game as objects of operation in the virtual 3-D space are stored in this virtual world area 22e. The other area 22f is used for temporarily storing local variables resulting from execution of the program and the like. The area table 22h described later is also stored in the other area 22f.

The game apparatus 20 of this embodiment causes a change in an image displayed on the screen of the output unit 30 by detecting in what flow (direction) the depiction of the game contents is to be changed in response to a manual input made by the player, reading out movie data corresponding to the stream of change in depiction from the CD-ROM 10 which is a storing means, and reproducing the read-out data. The game apparatus 20 having the aforementioned configuration is therefore provided with detecting means for detecting the stream of changes in depiction, reading means for reading out the movie data, and movie image display means causing a change in the displayed image. More specifically, the detecting means and the reading means are embodied by the controller unit 21 executing a detecting program and a reading program stored in the CD-ROM 10, respectively. The movie image display means is realized by the graphics processor 26.

Further, the game apparatus 20 of this embodiment switches the view point within the virtual space along with a move of an object of operation, such as a character, so that the character is displayed in a changed direction as if the character is viewed from the switched view point. The game apparatus 20 having the aforementioned configuration is therefore provided further with switching means for switching over the view point in response to the stream of changes in the displayed image. This switching means is achieved, when the character is composed of polygons, by determining coordinates of each vertex of the polygons by calculation by means of the controller unit 21 on the basis of the view point information table described later.

The CD-ROM 10 previously retains image data to be covered by graphic processing by the game apparatus 20. The image data include 3-D modeling data, which are image data obtained by 3-D-modeling a character operated by the player, and forward movie data and backward movie data, which are image data groups depicting the background of the virtual world.

Both the forward movie data and the backward movie data are background images of the same contents, i.e., animation images expressing the background changing along with movement of the character within a certain section in the virtual world. The forward movie data and the backward movie data are different from each other in that the sequence of reproduction is reversed, i.e., the data are recorded in the CD-ROM 10 so that the background reproduced from the backward movie data forms an inverted reproduction relative to the background reproduced from the forward movie data.

Figure 3:
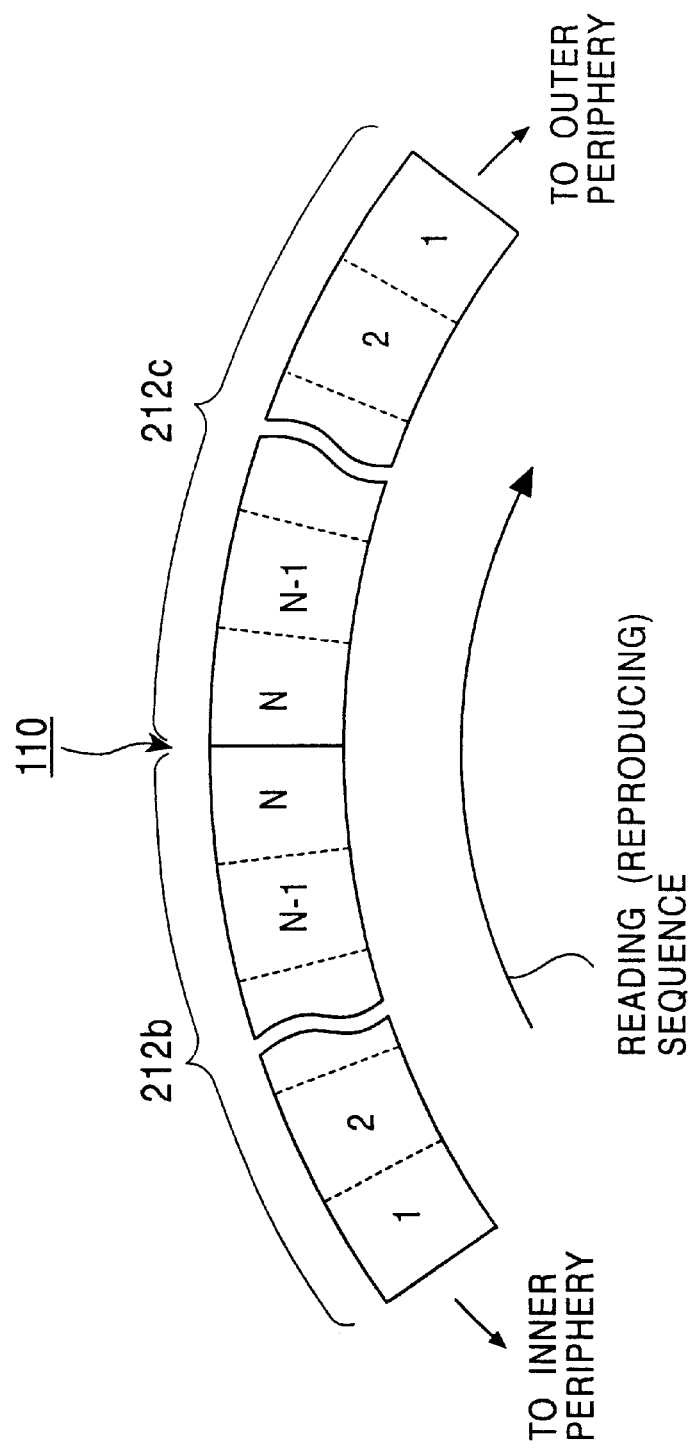
FIG. 3 is a schematic view for explaining the stored condition of movie data recorded in a CD-ROM in accordance with embodiment 1.

FIG. 3 is a schematic view for explaining the storing state of movie data recorded in the CD-ROM 10. The numerals in FIG. 3 represent numbers of the frame images composing the forward movie data 212b and the backward movie data 212c, corresponding to the sequence upon image reproduction. Frame images bearing the same numeral are image data having the same contents. That is, frame images assigned the same numeral display the same images. The frame image is image data corresponding to one frame of animation displayed for only 1/60 seconds on the screen of the output unit 30.

As is known from FIG. 3, both the forward movie data 212b and the backward movie data 212c comprise N (N is an integer) identical frame images and are recorded in succession on a track 110 of the CD-ROM 10. However, the forward movie data 212b contain constituent frame images arranged in a sequence that is reverse from the frame images composing the backward movie data 212c. In other words, starting from a position close to the inner periphery of a track formed in a spiral shape in the CD-ROM 10, i.e., from a position read out first by the optical head, for example, the forward movie data are recorded in a sequence of the first frame image, the second frame image, . . . , and then the N-th frame image, followed by the backward movie data recorded in a sequence of the N-th frame image, the (N−1)-th frame image, . . . , and then the first frame image. Because the CD-ROM 10 is rotated only in one direction, these frame images are read out in succession in the sequence of arrangement on the track. That is, the forward movie data 212b are movie 20 image data for forward reproduction, and the backward movie data 212c are movie image data for backward reproduction.

A section number of each frame image is the same. The stored position of frame images of a number stored respectively in the forward movie data 212b and the backward movie data 212c are correlated so that the stored position of a frame image can be specified from the stored position of the frame image of the same number in the other movie data. More specifically, as described later, it becomes possible to switch over a movie being reproduced forwardly into a backward movie at any point in time, or conversely, a movie being reproduced backwardly into a forward movie at any point in time.

In FIG. 3, the forward movie data 212b and the backward movie data 212c are recorded at positions adjacent to each other on the same track so that, when switching over the movie data to be reproduced between the forward movie data 212b and the backward movie data during movie reproduction, the seek time of the optical head of the CD-ROM drive 27 is reduced. It is, however, not always necessary that the forward movie data 212b and the backward movie data 212c are adjacent to each other on the same track.

The N frame images composing the movie data 212b and 212c are previously prepared as background images corresponding to the view point information stored in the view point information table (see FIG. 4) described later, i.e., as background images appearing when viewing the virtual world from the view point position specified by the view point information. The background images are prepared to avoid feeling differences which may occur when a 2-D projected image obtained through perspective projected conversion on the basis of the view point information and the background images displayed by the movie data are synthesized.

Figure 4:
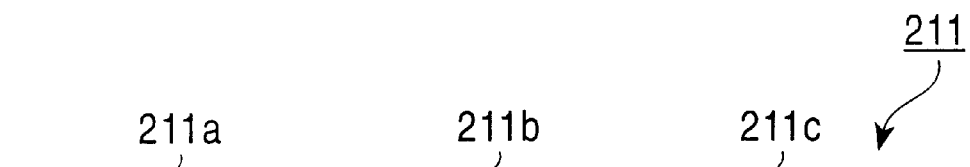
FIG. 4 is a table illustrating an exemplary data structure of the view point information table in accordance with embodiment 1.

The view point information table previously stores view point information used when transforming the virtual world into a 2-D (perspective projected transformation) object in correspondence with the individual frame images of the movie data used as background images. FIG. 4 is a table showing the data structure of the view point information table. The view point information table 211 previously stores a frame number 211a representing a background image corresponding to a position in the 3-D space of a character moving within the virtual world, view point coordinates 211b and an angle 211c as view point information corresponding to the frame number 211a.

The view point coordinates 211b are expressed by coordinates (XN, YN, ZN) on X-Y-Z axes, which represent the coordinates of the view point upon generation of a 2-D projected image corresponding to the frame number 211a, i.e., the position in the virtual 3-D space of the view point (X: X-component, Y: Y component, Z: Z-component). The angle 211c is expressed by θN, which represents the angle between the view line connecting the view point and the center of the projection screen, on the one hand, and the projection screen, on the other hand.

The controller unit 21 reads out a frame image of a background image corresponding to a position of the character in the virtual world by referring to the view point information stored in the view point information table 211, and generates a 2-D projected image by informing the graphics processor 26 of the view point information corresponding to this background image.

Operations centering around movie reproduction of the game apparatus 20 in embodiment 1 of the invention having the configuration as mentioned above will now be described. The following description will cover a case where movie (movie image) reproduction is carried out for displaying a background changing along with movement of the character in the virtual 3-D space.

Figure 5:
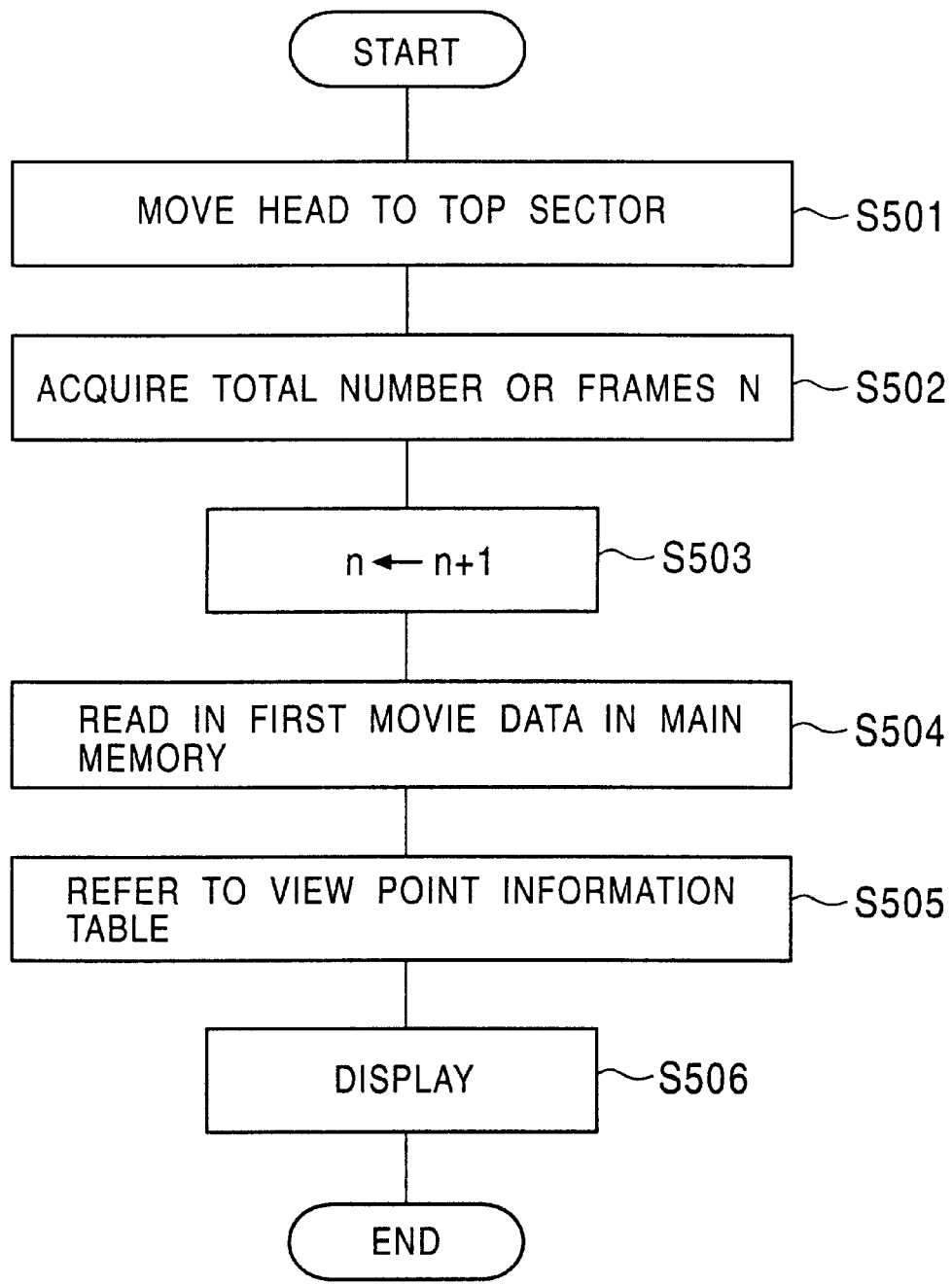
FIG. 5 is a flowchart illustrating the flow of initialization immediately after start of movie-reproduction in accordance with embodiment 1.

FIG. 5 is a flowchart illustrating the flow of initialization immediately after start of movie reproduction by the game apparatus. It is assumed, in this description, that the game has already been started, the arrangement positions of the characters and modeling data thereof are stored in the virtual world area 22e of the RAM 22, and the view point information table 211 matching movie reproduction to be soon started is loaded onto the view point information table area 22d of the RAM 22.

When a prescribed screen of the game is reached, the CD-ROM drive 27 makes preparations for reading out the top frame image of the movie data (assumed to be the forward movie data 212b) to be reproduced. More specifically, the CD-ROM drive 27 reads out directory information of the forward movie data 212b from the CD-ROM 10, and then the optical head is moved to the position of the first sector recording the frame image of frame No. 1 of the forward movie data 212b (step S501).

Subsequently, the controller unit 21 acquires the total number of frame images to be reproduced (total number of frames) N (step S502). That is, the controller unit 21 acquires the total number of sectors S of the frame images composing the forward movie data 212b by referring to the directory information of the forward movie data 212b read out from the CD-ROM 10, and determines the total number of frames N from the acquired total number of sectors S in accordance with the following formula:

$$N=S/F$$

where, F is the number of sectors composing one frame image.

F is a predetermined fixed value that the controller unit 21 can obtain at the start of the game.

Then, the controller unit 21 increments by 1 the initial value (0) of the frame variable n representing the frame number of the frame image to be reproduced at the moment, and instructs the CD-ROM drive 27 to read out the frame image represented by the frame variable n (step S503).

The CD-ROM drive 27 reads out the first frame image of the forward movie data 212b from the CD-ROM 10, and transfers it to the graphics processor 26 (step S504).

The controller unit 21 refers to the view point information table 211, and informs the graphics processor 26 of the view point information corresponding to the frame number n (step S505).

The graphics processor 26 prepares a 2-D projected image by applying a rendering processing such as perspective transformation and projection of a 3-D object onto a projection plane on the basis of the view point position and the angle shown by the view point information to an object stored in the virtual world area 22e. The graphics processor 26 synthesizes the resultant 2-D projected image as a foreground image to be arranged in front of the background image comprising the first frame image read out from the CD-ROM 10 (step S506).

The 2-D projected image of the virtual world having a background comprising the first frame image of the forward movie data 212b is thus displayed on the screen of the output unit 30, thus completing preparations for movie reproduction.

Figure 6:
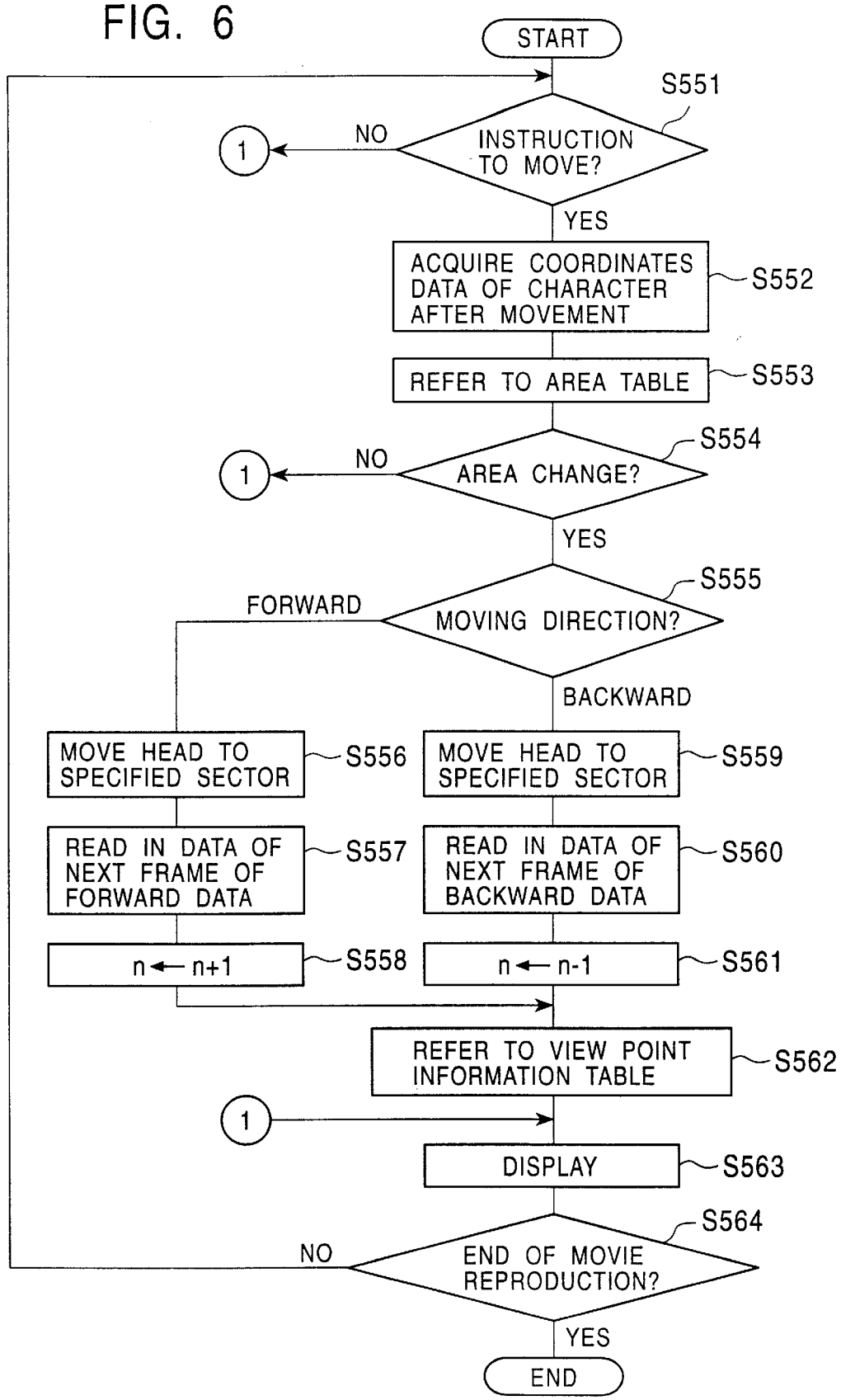
FIG. 6 is a flowchart illustrating an exemplary processing procedure of movie-reproduction in accordance with embodiment 1.

FIG. 6 is a flowchart showing a processing procedure for movie reproduction accomplished by the game apparatus 20 of this embodiment. In FIG. 6, the characters are assumed to be capable of moving in the right direction (forward) or the left direction (backward) in the screen in the virtual world.

First, the controller unit 21 determined whether or not the player has instructed a movement of a character by monitoring notification given by the input unit 25 through the interface unit 24 (step S551).

As a result, while the player makes no instruction of movement (step S551: No), the controller unit 21 does not issue a new instruction to the CD-ROM drive 27 or the graphics processor 26. The controller unit 21 therefore repeats display on the screen of the output unit 30 without the need to update the image resulting from the synthesis made immediately before (steps S563, S564 and S551).

When the player issues an instruction (step S551: Yes), on the other hand, the controller unit 21 acquires coordinate data specifying the position of the character after movement (step S552).

The controller unit 21 determines whether or not the character moves to another area for the ranges of all the areas, with reference to the area table 22h described later (steps S553 and S554). Specifically, the controller unit 21 determines whether or not the player has made an operation to move the character to the next area in the virtual 3-D space necessary for bringing forward the background animation by a frame. The area and the background image (No. of the frame image)in the virtual 3-D space are previously correlated.

When the character does not move to another area as a result of determination (step S554: No), the controller unit 21 does not issue a new instruction to the CD-ROM drive 27, and instructs the graphics processor 26 to synthesize the character image after movement onto the background image so far displayed. The graphics processor 26 conducts image synthesis in response to the instruction, and displays an image resulting from synthesis on the screen of the output unit 30 (step S563).

When the character moves to another area (step S554: Yes), on the other hand, the controller unit 21 determines whether the moving direction thereof is forward (first stream) or backward (second stream) (step S555). The method for determining the moving direction of the character will be described later. The terms forward and backward as used herein mean streams (directions) of change in depiction of the displayed image.

When the character moves to the right, i.e., in the forward direction (step S555: forward), the controller unit 21 instructs the CD-ROM drive 27 to move forward the animation of the background by a frame in a direction hereafter causing a change in the displayed image. Upon receipt of this instruction, the CD-ROM drive 27 reads out the (n+1)th frame image stored next in the forward movie data 212b, and the controller unit 21 transfers it to the graphics processor (steps S556–S557).

More specifically, the CD-ROM drive 27 moves the optical head to the sector position where the (n+1)th frame image of the forward movie data 212b recorded in the CD-ROM 10 is stored (step S556), and then, reads out the frame image onto the movie buffer area 22c of the RAM 22 (step S557). The read-out frame image is transferred, by the controller unit 21, to the graphics processor 26.

The controller unit 21 increments by 1 the frame variable n to record the fact that the movie has been moved forward by a frame (step S558).

When the character moves to the left, i.e., in the backward direction (step S555: background), on the other hand, the controller unit 21 instructs the CD-ROM drive 27 so as to bring the animation of the background by a frame backward, i.e., in a direction bringing back the change. Upon receipt of this instruction, the CD-ROM drive 27 reads out the (n−1)th frame image stored next in the backward movie data 212c, and the controller unit 21 transfers it to the graphics processor 26 (steps S559–S560).

More specifically, the CD-ROM drive 27 moves the optical disk to the sector position where the (n-1)th frame image of the backward movie data 212c recorded in the CD-ROM 10 is stored (step S559), and then, reads out the frame image onto the movie buffer area 22c of the RAM 22(step S560). The read-out frame image is transferred by the controller unit 21 to the graphics processor 26.

The controller unit 21 decrements by 1 the frame variable n to record the fact that the movie has been moved backward by a frame (step S561).

When switching the direction of reproduction of the movie data from forward to backward, or backward to forward, it is necessary to move the optical head of the CD-ROM drive 27 to the storing position of the n-th frame image in the backward movie data 212c (or the forward movie data 212b) from the forward movie data 212b (or the backward movie data 212c). As is known from the recorded status of the movie data 212b and 212c as shown in FIG. 3, the amount of movement (number of sectors) is calculated by the use of the following formula:

$$((N-n) \times 2+1) \times F$$

where, N is the total number of frames of the individual movie data 212b and 212c; n is the number of the frame image at which the optical head is currently positioned; and F is the number of sectors composing one frame image.

The amount of movement of sectors of the optical head from the top position may be calculated by determining the top positions of the movie data 212b and 212c, respectively.

Upon completion of update of the frame variable n in step S558 or step S561, the controller unit 21 reads out the view point information 211b and 211c corresponding to the frame number 211a represented by the current frame variable n with reference to the view point information table 211, and informs the graphics processor 26 of the result (step S562).

Upon receipt of the notice of new view point information, the graphics processor 26 applies a rendering processing, such as perspective transformation and projection of a 3-D object, onto a projection plane of the virtual world stored in the virtual world area 22e in accordance with the received view point information. The graphics processor 26 synthesizes from the obtained 2-D projected image of the character (virtual world) serving as a foreground image into a background image comprising the frame image sent from the CD-ROM drive 27, and displays the resultant synthesized image on the screen of the output unit 30 (step S563).

Upon completion of processing causing a change of the background image movie by a frame, the controller unit 21 determines whether or not movie reproduction has come to an end (step S564). That is, the controller unit 21 determines whether or not the frame variable n has reached, at this point, the total number of frames N.

As a result, when the frame variable n has not as yet reached the total number of frame N (step S564: No), update of the background image based on an instruction of movement from the player and movement of the character are repeated again (steps S551 to S563). When the frame variable n has reached the total number of frames N (step S564: Yes), on the other hand, movie reproduction is discontinued, and the processor is transferred to the next scene of the game (game progress).

One of the two previously prepared kinds (forward/backward) of movie data 212b and 212c is selected in response to the moving direction (forward/backward) of the character in the virtual 3-D space, and is reproduced into an animation of the background as described above. As a result, even in the middle of movie reproduction, it is possible to virtually reverse the direction of reproduction at any point by switching between the kinds of movie data.

The virtual world including the characters is perspectively transformed and projected onto a projection plane in a 3-D form on the basis of the view point information corresponding to the background image, synthesized as a foreground image with the background image, and displayed on the screen of the output unit 30. It is thus possible to synthesize the two images (a background image and a foreground image) without causing the player to feel a difference.

Figure 7:
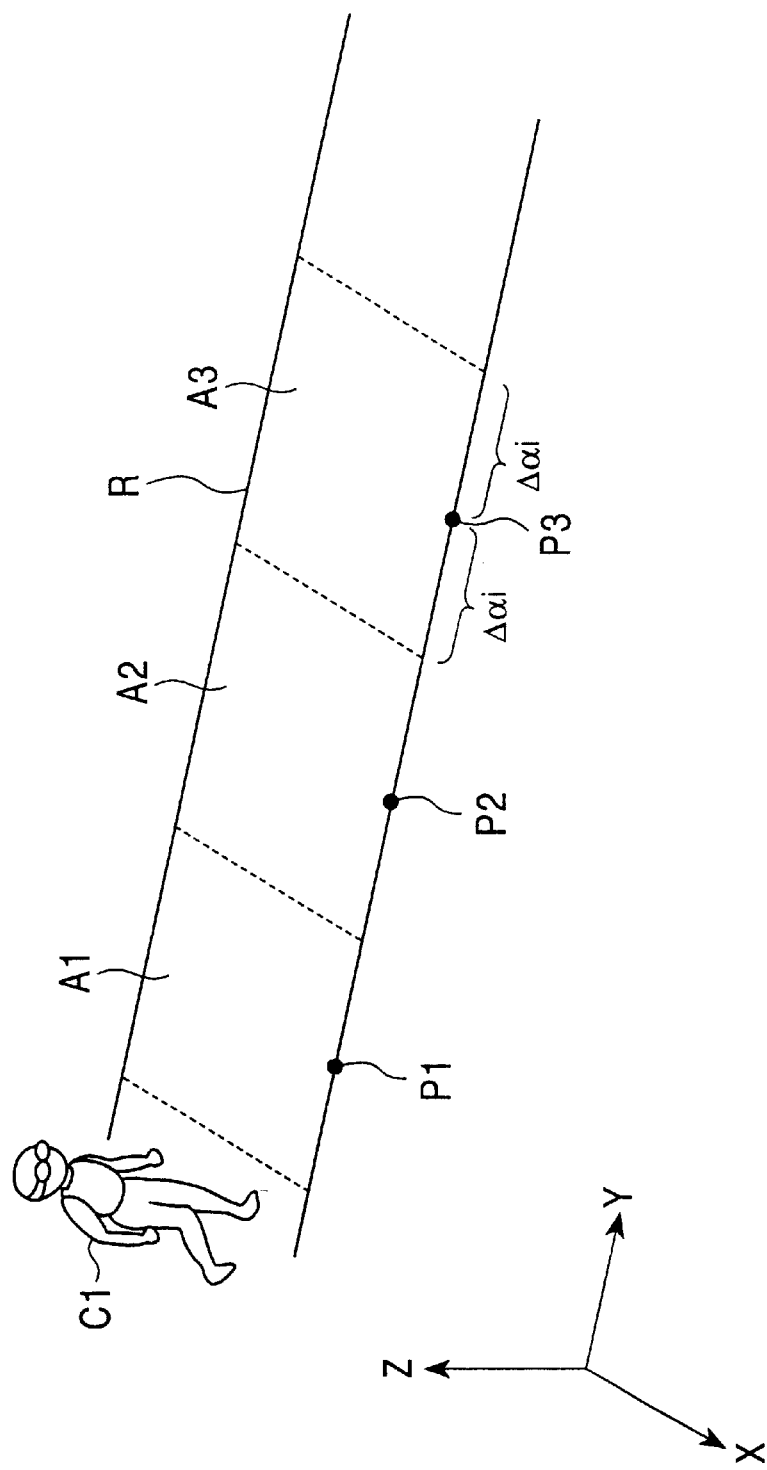
FIG. 7 is a descriptive view for explaining a method of determination of the moving direction of a character in accordance with embodiment 1.
Figure 8:
FIG. 8 is a table illustrating an exemplary data structure of the area table in accordance with embodiment 1.

The method for determining the moving direction of the character and the area table 22h will now be described. FIG. 7 is a descriptive view for explaining the method for determining the moving direction of the character; and FIG. 8 is a table showing the data structure of the area table 22h. As shown in FIG. 7, for example when a character C1 advances along the longitudinal direction on a road R, the road R is longitudinally divided into a number of areas A1, A2, A3, . . . , and reference points P1, P2, P3, . . . are set for the areas A1, A2, A3, . . . The area table 22h stores the area number 221a, coordinates 221b of the reference point, the range of that area, and a frame No. 221d specifying a frame image thereof.

These areas A1, A2, A3, . . . have prescribed ranges on the basis of coordinates of the reference points P1, P2, P3, . . . , respectively. For example, as shown in FIG. 8, in the area A1, the reference point has coordinates (XB1, YB1, ZB1). If the difference between the reference point and the boundary is expressed by $\Delta\alpha$, and the range thereof would be from YB1+$\alpha$1 to YB1+$\alpha$1, since the character C1 advances along the Y-axis in the example shown in FIG. 7. In the area A2, similarly, the coordinates of the reference point and the range would be (XB2, YB2, ZB2) and from YB2−$\alpha$2 to YB2+$\alpha$2, respectively and in the area AN, the coordinates of reference point and the range would be (XBN, YBN, ZBN) and from YBN−aN to YBN+aN, respectively.

When the character C1 moves, the area where the character C1 is located and the moving direction thereof are determined by comparing the coordinates of the character C1 and the coordinates of the reference points P1, P2, P3, . . . of the areas A1, A2, A3, . . . and deriving a difference between them.

More specifically, in the example shown in FIG. 7, the area where the character C1 is currently located can be determined by determining in which of the range of area A1, (YB1−$\alpha$1 to YB1+$\alpha$1), the range of area A2, (YB2−$\alpha$2 to YB2+$\alpha$2), . . . and the range of area AN, (YBN−$\alpha$N to YBN+$\alpha$N) the value of Y coordinates of the character C1 is contained, since the character C1 moves along the Y-axis. A difference value is calculated by subtracting the Y-coordinate value of the reference point of the area where the character C1 is currently present from the Y-coordinate value of the character C1 after movement in step S552.

It is determined whether or not the calculated value of difference exceeds the range $\Delta\alpha$ of area where the character C1 is currently located. When it exceeds the range, the character C1 is determined to have moved to another area (step S554). When the determined value of difference is larger than the boundary value +$\alpha$N of the area where the character C1 is currently present in step S555, the moving direction of the character C1 is considered to be forward. When the calculated value of difference is smaller than the boundary value−$\alpha$N of the area where the character C1 is currently located, the moving direction of the character C1 is judged to be backward.

FIGS. 9A to 9D illustrate examples of display on the screen DP1 of the output unit 30 in forward movie reproduction. Images obtained by synthesizing the background image BG comprising the forward movie data 212b with a 2-D projected image resulting from 2-D processing of the character C1 serving as the foreground image.

In all these drawings, the background image and the foreground image are images viewed from the same view point in the same direction. More specifically, in FIG. 9A, the displayed image is the character C1 as viewed just from a side. In FIG. 9B, the character C1 is viewed slightly diagonally from the front. In FIG. 9C, the screen display represents the character C1 as viewed from a position closer to the front. In FIG. 9D, the screen display shows the character C1 as viewed solely from front.

Operations made by the player and actions of the game apparatus 20 will now be described with reference to FIGS. 9A to 9D.

Figure 9A:
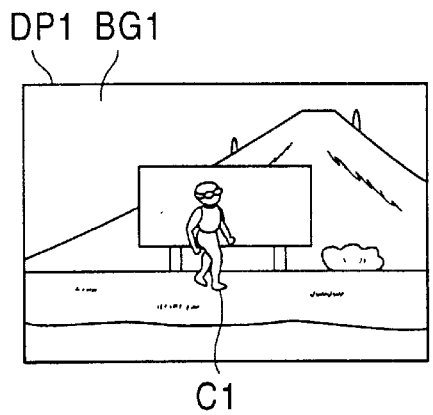
FIGS. 9A–9D illustrate an example of screen displays in movie-reproduction in a forward direction in accordance with embodiment 1.
Figure 9B:
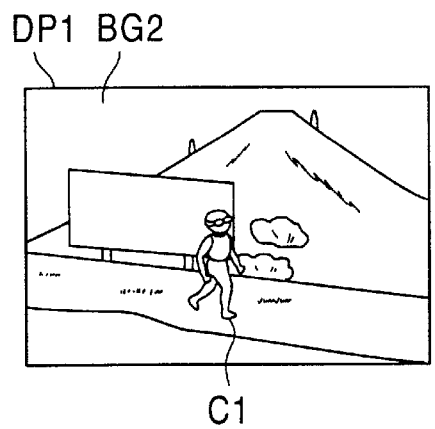
Figure 9C:
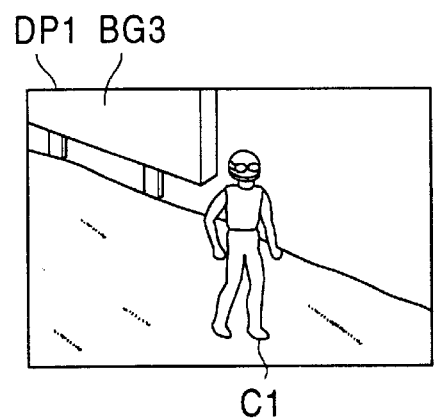
Figure 9D:
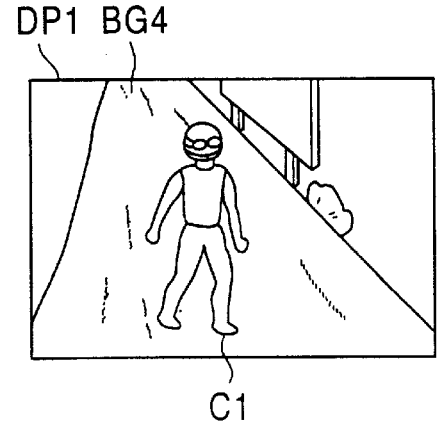

When the game scene as shown in FIG. 9A is encountered, for example, (steps S501 to S506 shown in FIG. 5), the player can press a direction button on the input unit 25 to cause the character C1 to advance on an unforked road as shown by a screen transition changing in a sequence of FIGS. 9A→9B→9C→9D (steps S551 to S558 and S562 to S564 in FIG. 6). In this case, for example, the forward movie data 212b are displayed on the screen DP1 as background images BG1→BG2→BG3→BG4.

FIGS. 10A to 10D illustrate examples of display on the screen DP1 of the output unit in backward movie reproduction. In a game scene as shown in FIG. D, on the other hand, the player can cause the character C1 to advance backward on an unforked road as shown by the screen transition in sequence of FIGS. 10A→10B→10C→10D, i.e., to cause the character C1 to go back on the road it has just followed (steps S551 to S555 and S559 to S564 in FIG. 6).

Figure 10A:
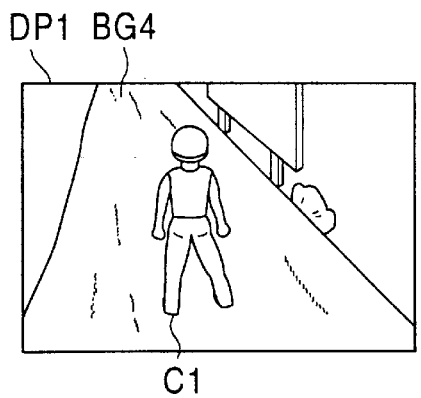
FIGS. 10A–10D illustrate an example of screen displays in movie-reproduction in a backward direction in accordance with embodiment 1.
Figure 10B:
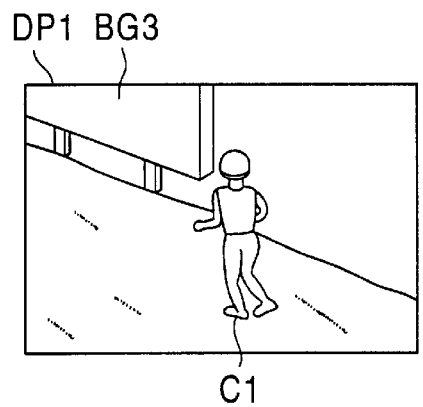
Figure 10C:
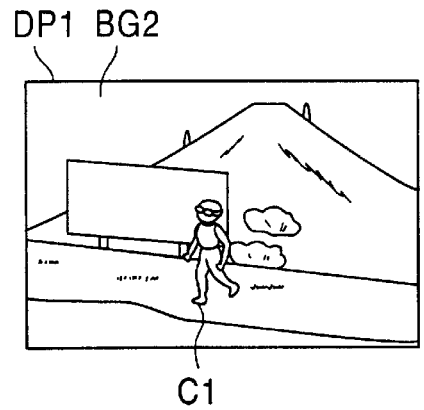
Figure 10D:
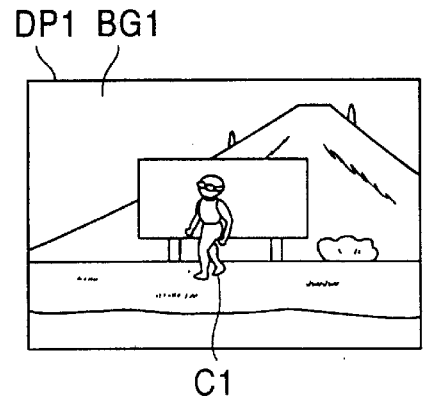

At this point, for example, the backward movie data 212c are displayed on the screen DP1 as background images BG4→BG3→BG2→BG1; and the character C1 advances in the forward direction. That is, upon display of FIG. 10A corresponding to FIG. 9D, the character C1 has his/her back to the player so that the back of the character C1 is displayed. In the display of FIGS. 10B→10C corresponding to FIGS. 9C→9B, the character C1 is displayed as viewed from diagonally rearward.

The timing at which it is possible to reverse the moving direction of the character C1 as described above, i.e., to reverse the direction of movie reproduction is not limited to the starting and ending points of movie shown in FIGS. 9A and 9D, but may be at any point in the middle of movie data 212b and 212c such as these shown in FIGS. 9B and 9C.

For example, the player can first cause the character C1 to advance as indicated by the screen transition changing in a sequence of FIGS. 9A→9B→9C, then cause the character C1 to go back as indicated by the screen transition changing in a sequence of FIGS. 10B→10C, and then, cause the character C1 to advance again as indicated by the screen transition changing in a sequence of FIGS. 9B→9C→9D. In this case, in response to the individual moving directions, the forward movie data 212b are first read out, followed by the backward movie data 212c, and then, the forward movie data 212b are read out again.

In this embodiment 1, as described above, two kinds of movie data including forward and backward data are prepared in advance, and any of these kinds of movie data is selected and read out in sync with the moving direction of the character in the game for reproduction. The player can consequently, even during reproduction of movie data in a certain direction, freely perform a game operation accomplishing a pseudo reversal of the direction of reproduction at any point.

Because these two kinds (forward and backward) movie data are recorded at positions adjacent to each other in the CD-ROM, and the same frame images are stored at positions correlated with each other, the time required for reproduction by switching over between the forward movie data 212b and the backward movie data 212c during reproduction, i.e., the time required for specifying from the forward movie data the same frame image in the backward movie data or vice versa, and the seek time of the optical head for reading out as specified frame image are reduced. This makes it possible to instantaneously switch over movie data for reproduction without a lengthy waiting time immediately after switching of the reproduced movie data.

Further, the virtual world including the characters composed of polygons is perspectively transformed and projected from 3-D onto a projection plane on the basis of the view point information corresponding to the background images, and the resultant 2-D projected image is displayed on the screen of the output unit 30 as a foreground image synthesized with the background images. By synthesizing these two images (backward image and foreground image), therefore, it is possible for the player to perform a game smoothly without a feeling of deviation.

Embodiment 2

An embodiment 2 of the game apparatus of the present invention will now be described. Embodiment 2 is similar to embodiment 1 in that two kinds (forward and backward) of movie data, i.e., movie data forming a pair are prepared in advance for a moving picture, and is different from the latter in that a plurality of different kinds of moving pictures are held. The game apparatus 20 and the game system have the same configurations as those in embodiment 1 shown in FIG. 1. Description thereof is therefore omitted here. Only particulars different from those in embodiment 1 will be described.

More specifically, embodiment 2 differs from embodiment 1 in that the CD-ROM 10 holds three sets of movie data 212d and 212e, movie data 212f and 212g, and movie data 212h and 212i (see FIG. 11), and is provided with three kinds of view point information table 213, 214 and 215 corresponding to these three sets of movie data (see FIG. 12).

That is, the first forward movie data 212d, the first backward movie data 212e and the first view point information table 213 are data sets used for drawing the same (the first kind of) moving picture, and are used, for example, when the character is located within an area known as "road 1" in the virtual space.

On the other hand, the second forward movie data 212f, the second backward movie data 212g and the second point information table 214 are data sets used for drawing the same (the second kind of) moving picture, and are used, for example, when the character is located within an area known as "road 2" in the virtual space.

Similarly, the third forward movie data 212h, the third backward movie data 212i and the third view point information table 215 are data sets used for drawing the same (the third kind of) moving picture, and are used, for examples, when the character is located within an area known as "road 3" in the virtual space.

However, the road 1, the road 2 and the road 3 are not perfectly independent areas, but areas including common regions as connecting points. For example, this is similar to a case where three roads containing common regions (branching points) such as T-crossings are called road 1, road 2 and road 3. This configuration is adopted so that, in the game, the character can advance or return on a road and in addition, the player can switch the road to another at the branching point to advance on the new road. That is, this is for the purpose of switching over the kind of movie adopted as the background image at the branching point.

Figure 11:
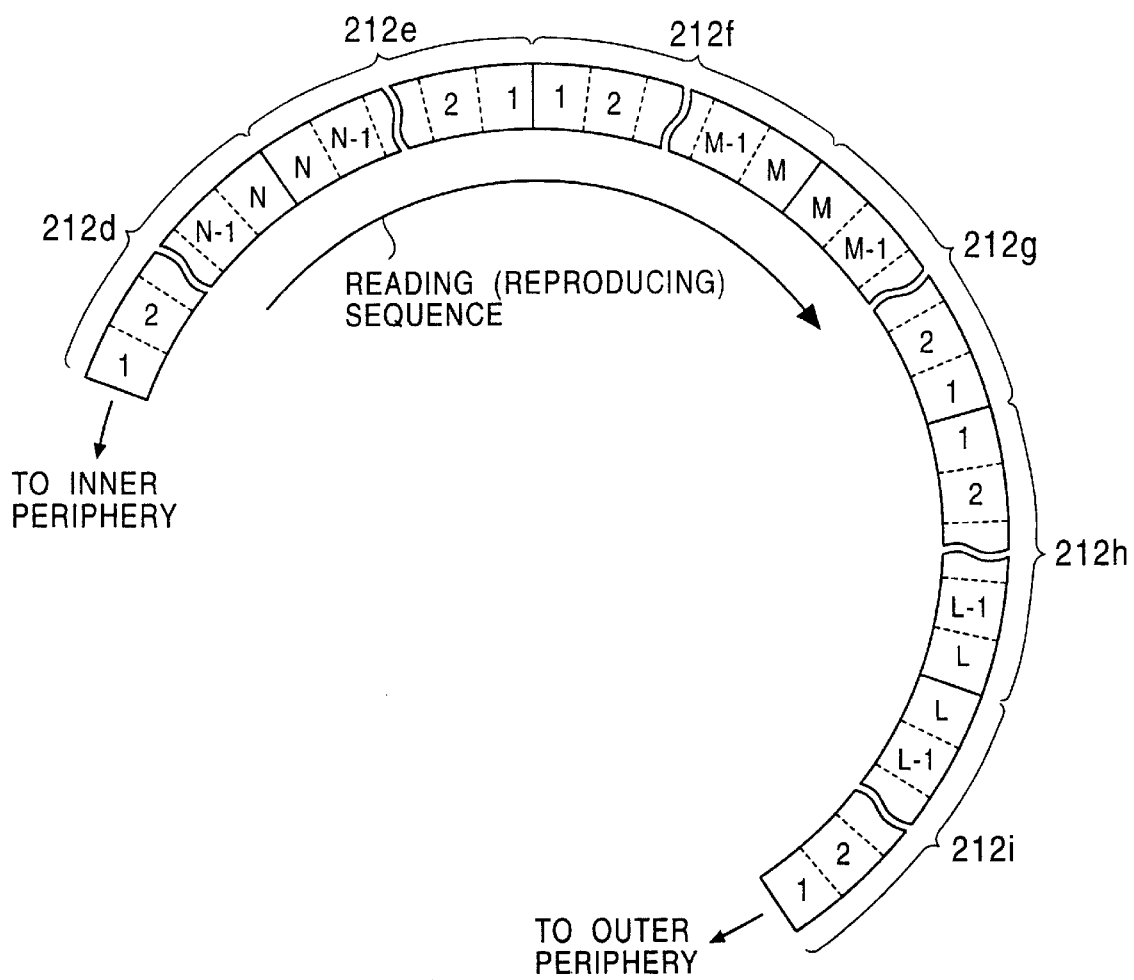
FIG. 11 is a schematic view for explaining the stored condition of movie data recorded in a CD-ROM in accordance with embodiment 2 of the invention.

FIG. 11 illustrates the recorded state of the first forward and backward movie data 212d and 212e, the second forward and backward move data 212f and 212g, and the third forward and backward movie data 212h and 212i in the CD-ROM 10. The basic structure is the same as in embodiment 1 shown in FIG. 3. That is, the three (forward and backward) image groups constituting the movies of the same kind (first, second or third) are stored in the inverted sequence.

However, the three kinds (first, second and third) movie data represent moving pictures of different backgrounds and have a different total number of constituent frame images. In the example shown, the total number of frame images is N for the first movie data, M for the second movie data, and L for the third movie data. Although not particularly limited, in the example shown, these movie data are stored at positions adjacent to each other on the same track, i.e., in neighboring sectors. This reduces the seek time of the CD-ROM drive 27 when switching the movie data to be reproduced among the three pairs, i.e., six movie data.

These three kinds (first, second and third) of movie data contain background images for the common regions (branching points), respectively. For example, the background shown by the 100-th frame image contained in the first forward and background movie data 212d and 212e, the background shown by the first frame image contained in the second forward and background movie data 212f and 212g, and the background shown by the first frame image contained in the third forward and backward movie data 212h and 212i are 3-D images in all cases representing a T-crossing and surroundings.

Mapping of these three kinds (first, second and third) of movie data (frame image Nos. representing the common regions) is previously described in the game program, and the controller unit 21 can know to information at the start of the game.

FIGS. 12A, 12B and 12C illustrate the data structures of the first view point information table 213, the second view point information table 214 and the third view point information table 215, respectively, corresponding to FIG. 4 in embodiment 1.

The first view point information table 213 shown in FIG. 12A is a collection of N pieces of view point information corresponding to the frame images composing the first forward and backward movie data 212d and 212e, and stores, for example, information specifying a view point used for preparing a 2-D image of the character moving on the road 1 within the virtual world.

Similarly, the second view point information table 214 shown in FIG. 12B is a collection of M pieces of view point information corresponding to the frame images composing the second forward and backward movie data 212f and 212g, and stores, for example, information specifying a view point used for preparing a 2-D image of the character moving on the road 2 within the virtual world.

Similarly, the third view point information table 215 shown in FIG. 12C is a collection of L pieces of view point information corresponding to the frame images composing the third forward and backward movie data 212h and 212i, and stores, for example, information specifying a view point used for preparing a 2-D image of the character moving on the road 3 within the virtual world.

Operations centering around movie reproduction of the game apparatus 20 in embodiment 2 of the invention having the aforementioned configuration will now be described.

Figure 13:
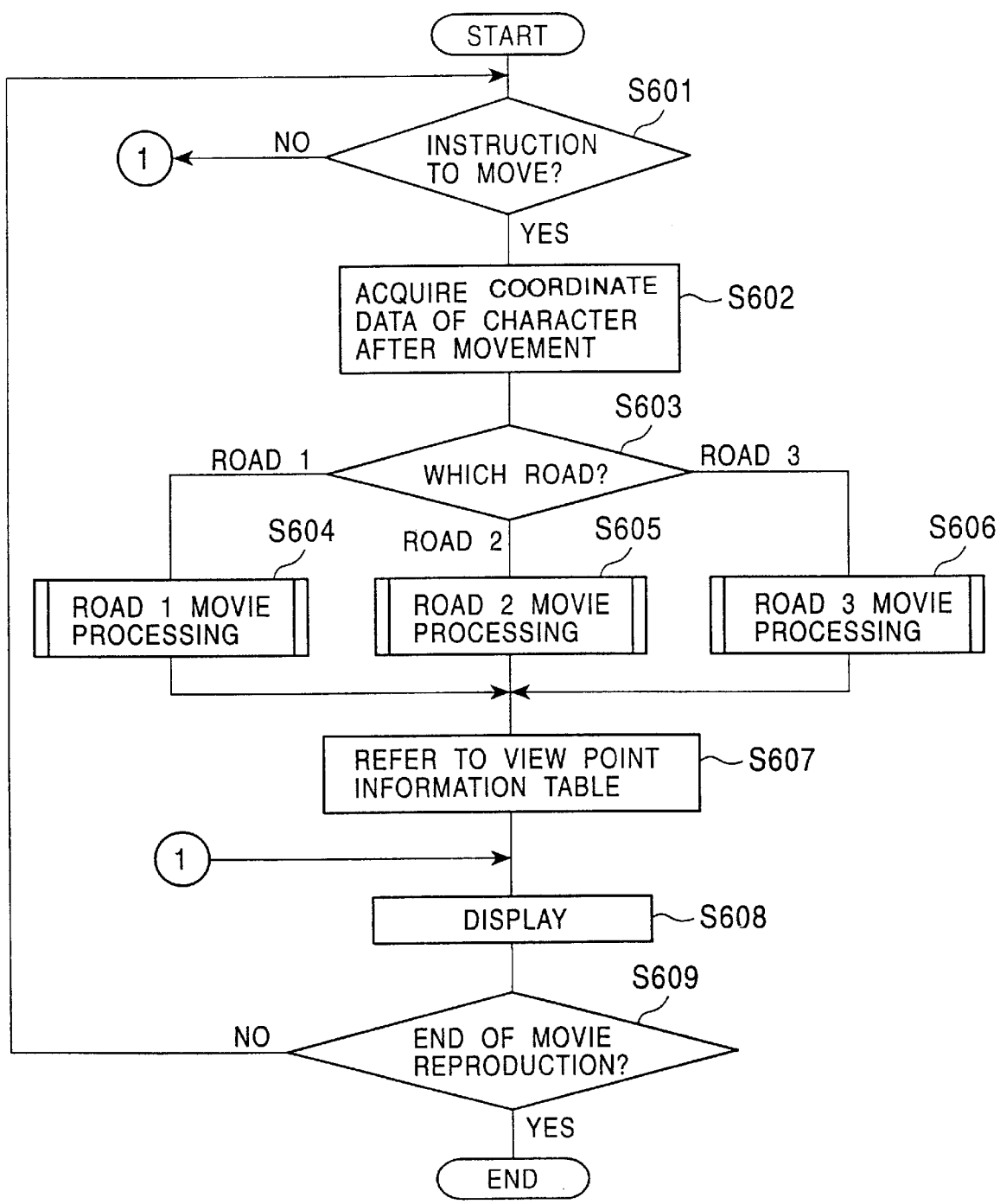
FIG. 13 is a flowchart illustrating an example of the entire processing procedure of movie-reproduction in accordance with embodiment 2.
Figure 14:
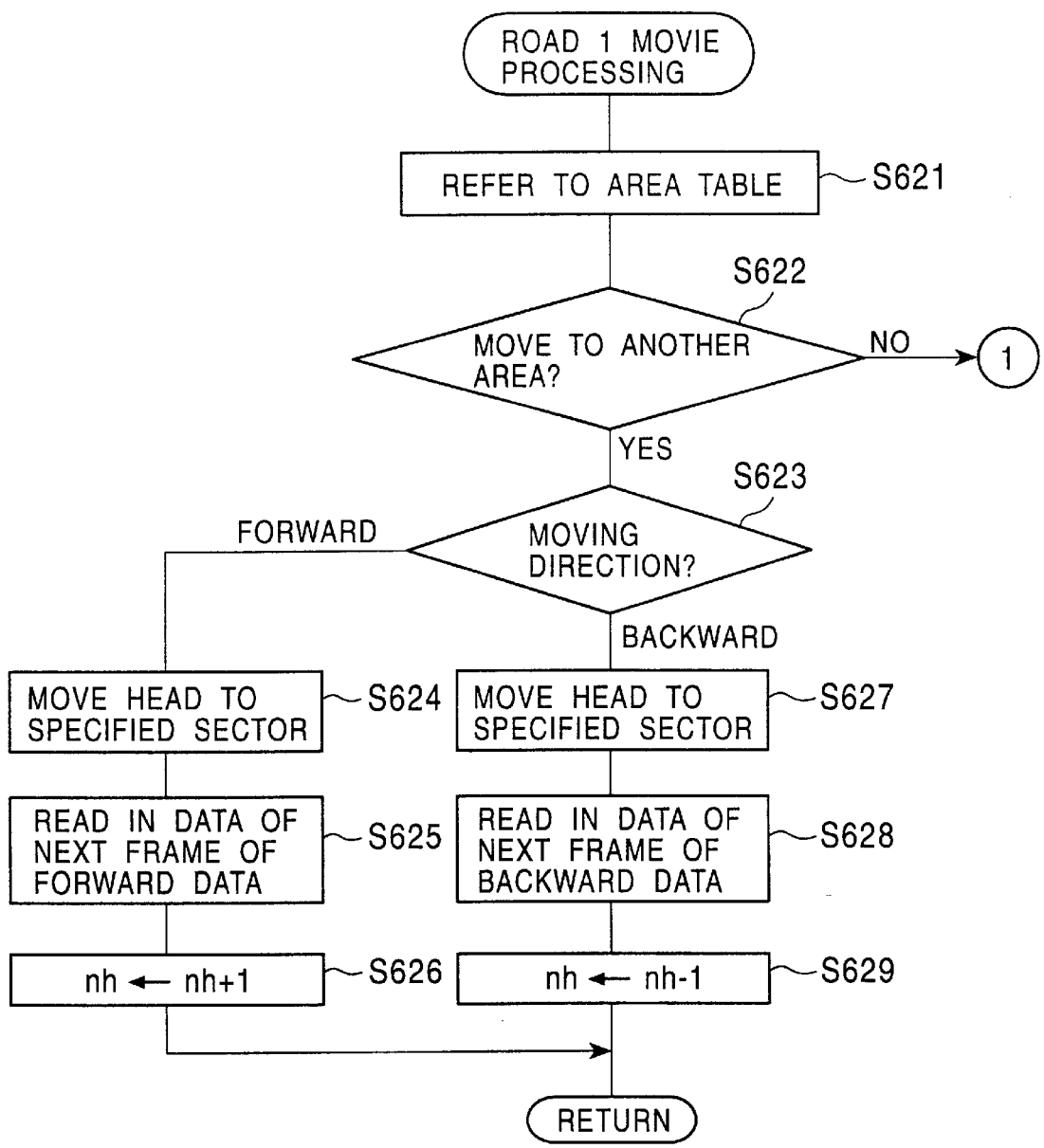
FIG. 14 is a flowchart illustrating movie-reproduction of road 1 in accordance with embodiment 2.
Figure 15:
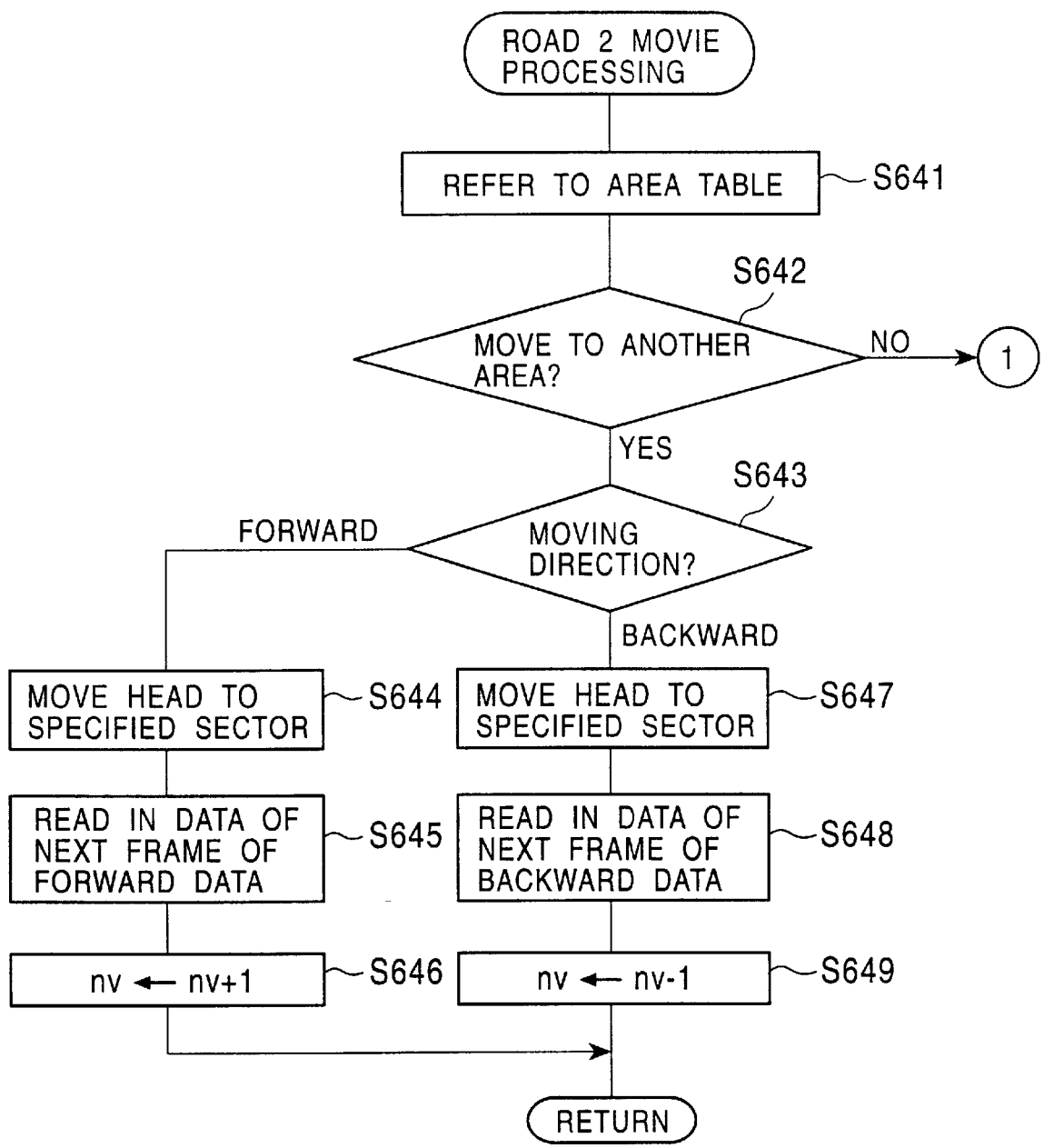
FIG. 15 is a flowchart illustrating movie-reproduction of road 2 in accordance with embodiment 2.
Figure 16:
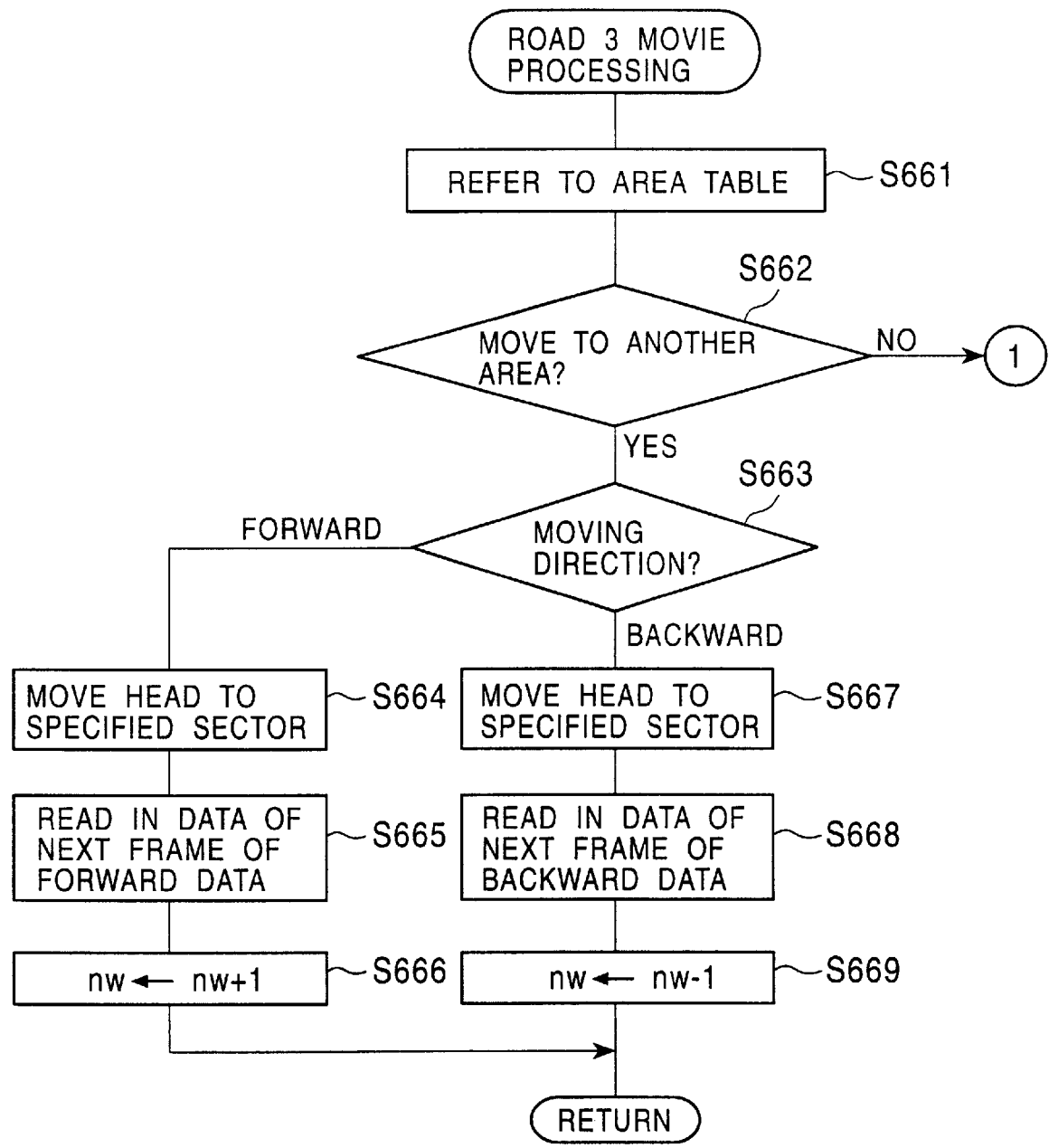
FIG. 16 is a flowchart illustrating movie-reproduction of road 3 in accordance with embodiment 2.

FIG. 13 is a flowchart illustrating an exemplary processing procedure of movie reproduction effected by the game apparatus 20 in embodiment 2; FIG. 14 is a flowchart illustrating the details of exemplary movie reproduction processing (step S604) of the road 1 in FIG. 13; FIG. 15 is a flowchart illustrating the details of the movie reproduction processing (step S605) of the road 2 in FIG. 13; and FIG. 16 is a flowchart illustrating the details of the movie reproduction processing (step S606) of the road 3 in FIG. 13. These flowcharts correspond to the flowchart in embodiment 1 shown in FIG. 6.

Embodiment 2 is similar to embodiment 1 in that, when the game reaches a prescribed scene, the top frame image of the movie data is read out and displayed, and is different from embodiment 1 in that the individual movie data are mapped with the corresponding positions of characters. In embodiment 2, therefore, in the processing step S502 shown in FIG. 5, data in a total frame number (for example, the three kinds including N, M and L) of a plurality of movie data is acquired.

Further, embodiment 2 differs from embodiment 1 in that, when an instruction to move the character is issued by the player, the controller unit 212 acquires coordinate data specifying the position of the character after movement (step S602), determines the position of the character in a virtual 3-D space at this point (road 1, road 2 or road 3) (step S603), and reads out the movie data of the kind (first, second or third) corresponding to the result of determination as the background image (steps S604, S605 and S606).

Although not particularly limited, the road 1 is assumed to be an area where the character can be moved simply by pressing the right/left button of the input unit 25; the road 2, to be an area where the character can be moved simply by acting on the up/down button of the input unit 25; and the road 3, to be an area where the character can be moved simply by operating the right/left button of the input unit 25. For the road 1 and 3, the direction in which the character is moved by the right button is assumed to be the forward direction; and for the road 2, the direction in which the character is moved by the down button is assumed to be the forward direction.

Upon receipt of a notice of an instruction to move the character from the input unit 25 (step S601 in FIG. 13: Yes), the controller unit 21 acquires coordinate data specifying the position of the character after movement (step S602), and determines in which of road 1, road 2 or road 3 the position of the character is located in the virtual 3-D space (step S603).

As a result, when the character is determined to be located in the road 1 (step S603: road 1), the movie processing routine of the road 1, shown in FIG. 14, is executed. Upon start of this routine, the controller unit 21 refers to the first area table 22h 1 (FIG. 18A) corresponding to the road 1 (step S621), and determines whether or not the character moves to another area relative to the ranges of the individual areas (step S622).

When the character does not move to the other area as a result of this determination (step S622: No), the controller unit 21 does not issue another instruction to the CD-ROM drive 27, and instructs the graphics processor 26 to synthesize the background image so far displayed with the image of the character after movement. The graphics processor 26 conducts image synthesis in accordance with the instruction, and displays the image prepared through the synthesis on the screen of the output unit 30 (step S608 in FIG. 12).

When the character moves to another area (step S622: Yes), on the other hand, the controller unit 21 determines whether the moving direction is forward (first stream) or backward (second stream) (step S623). The method for determining the moving direction of the character is the same as in embodiment 1.

When the character moves forward (step S623: forward), the controller unit 21 instructs the CD-ROM drive 27 to move the moving picture of the background by a frame in the forward direction. Upon receipt of this instruction, the CD-ROM drive 27 reads out the (nh+1)th frame image stored next in the first forward movie data 212d. The controller unit 21 extends it, and then, transfers it to the graphics processor 26 (steps S624 and S625). The variable nh is the frame variable for the road 1.

More specifically, the CD-ROM drive 27 moves the optical head to the position of the sector recording the (nh+1)th frame image of the first forward movie data 212d recorded on the CD-ROM 10 (step S624), and then, reads out this frame image into the movie buffer area 22c of the RAM 22 (step S625). The read-out frame image is extended by the controller unit 21, and then, transferred to the graphics processor 26.

The controller unit 21 increments by 1 the frame variable nh to record the fact that the movie has moved by a frame in the forward direction (step S626).

When the character moves backward (step S623: backward), on the other hand, the controller unit 21 instructs the CD-ROM drive 27 to bring back the moving picture of background by a frame. Upon receipt of this instruction, the CD-ROM drive 27 reads out the (nh−1)th frame image stored next in the first backward movie data 212e, and the controller unit 21 transfers it to the graphics processor 26 (steps S627 and S628).

More specifically, the CD-ROM drive 27 moves the optical head to the position of the sector recording the (nh−1)th frame image of the first backward movie data 212e recorded on the CD-ROM 10 (step S627), and then, reads out this frame image into the movie buffer area 22c of the RAM 22 (step S628). The read-out frame image is extended by the controller unit 21, and then, transferred to the graphics processor 26.

The controller unit 21 decrements the frame variable nh by 1 to record the fact that the movie has moved by a frame in the backward direction (step S629).

Upon the completion of update of the frame variable nh in step S626 or S629, the process goes back to the movie reproducing routine shown in FIG. 13.

When the character is determined to be in the road 2 in the determination of the road in the aforementioned step S603 (step S603: road 2), the controller unit 21 executes the movie processing routine of the road 2 shown in FIG. 15. After start of this routine, the controller unit 21 refers to the second area table 22h2 corresponding to the road 2 (step S641), and determines whether or not the character is to be moved to another area for the ranges of the individual areas (step S642).

When the character does not move to another area as a result of this determination (step S642: No), the controller unit 21 does not issue a new instruction to the CD-ROM drive 27, but instructs the graphics processor 26 to synthesize the background image currently displayed with the image of the character after movement. The graphics processor 26 performs image synthesis in accordance with the instruction, and displays the image resultant from the synthesis on the screen of the output unit 30 (step S608 in FIG. 13).

When the character moves to another area (step S642: Yes), on the other hand, the controller unit 21 determines whether the moving direction is forward or backward (step S643).

When the character moves forward (step S643: forward), the controller unit 21 instructs the CD-ROM drive 27 to move the background moving picture by a frame in the forward direction. Upon receipt of the instruction, the CD-ROM drive 27 reads out the (nv+1)th frame image stored next in the second forward movie data 212f, and the controller unit 21 transfers it to the graphics processor 26 (steps S644 and S645). The variable nv is a frame variable on the road 2. The controller unit 21 increments the frame variable nv to record the fact that the movie has been moved by a frame in the forward direction (step S646).

When the character moves backward (step S643: backward), on the other hand, the controller unit 21 instructs the CD-ROM drive 27 to bring the backward moving picture back by a frame in the backward direction. Upon receipt of this instruction, the CD-ROM 27 reads out the (nv−1)th frame image stored next in the second backward movie data 212g. The controller unit 21 transfers it to the graphics processor 26 (step S647 and S648). The controller unit 21 decrements the frame variable nv by one to record the fact that the movie has been brought back in the backward direction by a frame (step S649).

Upon the completion of update of the frame variable nv in step S646 or S649, the process returns to the movie reproducing routine shown in FIG. 13.

When the character is determined to be in the road 3 in the determination of road in the aforementioned step S603 (step S603: Road 3), the controller unit 21 executes the movie processing routine of the road 3 shown in FIG. 16. After start of this routine, the controller unit 21 refers to the third area table 22h 3 corresponding to the road 3 (step S661), and determines whether or not the character moves to another area relative to the ranges of the individual areas (step S662).

When the character does not move to another area as a result of determination (step S662: No), the controller unit 21 does not give a new instruction to the CD-ROM drive 27, but instructs the graphics processor 26 to synthesize the background image currently displayed with the image of the character after movement. The graphics processor 26 performs image synthesis in accordance with this instruction, and displays the newly synthesized image on the screen of the output unit 30 (step S608 in FIG. 12).

When the character moves to another area (step S662: Yes), on the other hand, the controller unit 21 determines whether the moving direction is forward or backward (step S663).

When the character moves forward (step S663: forward), the controller unit 21 instructs the CD-ROM drive 27 to move the background moving picture by a frame in the forward direction. Upon receipt of this instruction, the CD-ROM drive 27 reads out the (nw+1)th frame image stored next in the third movie data 212h. The controller unit 21 transfers it to the graphics processor 26 (steps S664 and S665). The variable nw is a frame variable for the road 3. The controller unit 21 increments the frame variable nw to record the fact that the movie has moved by a frame in the forward direction (step S666).

When the character moves backward (step S663: backward), on the other hand, the controller unit 21 instructs the CD-ROM drive 27 to bring the background moving picture back by a frame in the backward direction. Upon receipt of this instruction, the CD-ROM drive 27 reads out the (nw−1)th frame image stored next in the third backward movie data 212i. The controller unit 21 transfers it to the graphics processor 26 (steps S667 and S668).

The controller unit 21 decrements the frame variable nw by 1 to record the fact that the movie has been brought back by a frame in the backward direction (step S669).

Upon completion of update of the frame variable nw in step S666 or S669, the process returns to the movie reproducing routine shown in FIG. 13.

When the process returns from the movie processing routine to the movie reproducing routine shown in FIG. 13, the controller unit 21 reads out pieces of view point information 213b and 213c, 214b and 214c, or 215b and 215c corresponding to the frame Nos. 213a, 213b and 213c represented by the current frame variables nh, nv or nw with reference to the first view point information table 213, the second view point information table 214 or the third view point information table 215 in response to the specific road where the character is located, and notifies the graphics processor 26 of the read-out result (step S607).

Upon receipt of the notice of the new view point information, the graphics processor 26 performs rendering processing, such as perspective projecting transformation of the character stored in the virtual world area 22e, in accordance with the view point information, synthesizes the 2-D projected image of the resultant character serving as a foreground image with the background image comprising the frame image sent from the CD-ROM drive 27, and displays the synthesized image obtained on the screen of the output unit (step S608).

Upon the completion of a change of a frame of the movie of the background image as described above, the controller unit 21 determines whether or not movie reproduction has been completed (step S609). More specifically, when the character is in the road 1, the controller unit 21 determines whether or not the frame variable nh at this point of time has reached the total number of frames N, and when the character is in the road 2, whether or not the frame variable nv at this point has reached the total number of frames M. When the character is in the road 3, it determines whether the frame variable nw at this point has reached the total number of frames L.

When the total number of frames has not as yet been reached as a result (step S609: No), update of the background image and movement of the character based on an instruction to move from the player are repeated again (steps S601 to S609). When the total number of frames has been reached, on the other hand (step S609: Yes), movie reproduction comes to an end, and the process is transferred (progress of the game) to the next game scene.

Figure 17:
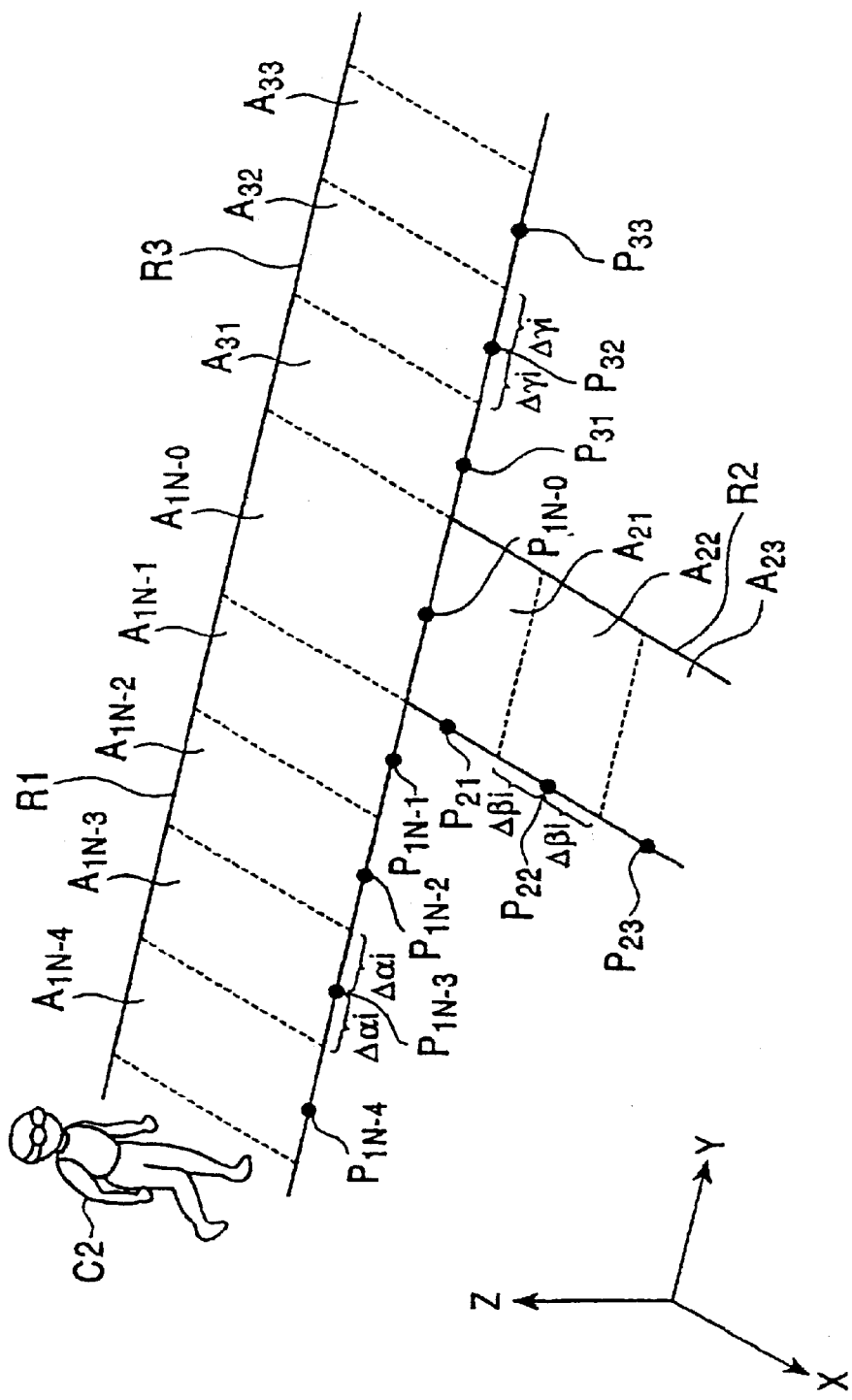
FIG. 17 is a descriptive view for explaining the method of determination of the moving direction of a character in accordance with embodiment 2.

The method of determining the moving direction of the character and the first to third area tables 22h 1, 22h 2 and 22h3 will now be described. FIG. 17 is a descriptive view for explaining the method of determining the moving direction of the character in a T-crossing composed of a road R1 (road 1), a road R2 (road 2) and a road R3 (road 3); and FIG. 18A, FIG. 18B, and FIG. 18C, respectively indicate a table showing the data structures of the area tables 22h1, 22h2 and 22h3.

The moving direction in the second embodiment is judged in accordance with the coordinates of reference points of respective areas as in the first embodiment and the coordinates where a character exists at the present time and after the character has moved. In FIG. 17, area $A_{1N-0}$ is an Nth area corresponding to road R1, area $A_{1N-1}$ is an (N−1)th area corresponding to road R1, area $A_{1N-2}$ is an (N−2)th area corresponding to road R1 area, $A_{1N-3}$ is an (N−3)th area corresponding to road R1, and area $A_{1N-4}$ is an (N−4)th area corresponding to road R1. The area $A_{21}$ is the first area belonging to road R2, the area $A_{22}$ is the second area belonging to the road R2, and the area $A_{23}$ is the third area belonging to road R2. The area $A_{31}$ is the first area belonging to road R3, the area $A_{32}$ is the second area belonging to road R3, and the area $A_{33}$ is the third area belonging to road R3.

Further, the respective reference points belong to one of the areas. In FIG. 17, the reference point $P_{1N-0}$ belongs to the area $A_{1N-0}$, the reference point $P_{1N-1}$ belongs to area $A_{1N-1}$, the reference point $P_{1N-2}$ belongs to area $A_{1N-2}$, the reference point $P_{1N-3}$ belongs to area $A_{1N-3}$, and the reference point $P_{1N-4}$ belongs to area $A_{1N-4}$. The reference point $P_{21}$ belongs to area $A_{21}$, the reference point $P_{22}$ belongs to area $A_{22}$, and the reference point $P_{23}$ belongs to area $A_{23}$, while the reference point $P_{31}$ belongs to area $A_{31}$, the reference point $P_{32}$ belongs to area $A_{32}$, and the reference point $P_{33}$ belongs to area $A_{33}$.

In the example illustrated in FIG. 17, road R1 has "N" areas, road R2 has "M" areas, and road R3 had "L" areas. An area table 22h1 in FIG. 18A, area table 22h2 in FIG. 18B, and area table 22h3 in FIG. 18C, respectively, correspond to road R1, road R2 and road R3. In the respective area tables, a range of an area belonging to the respective roads is determined on the basis of the reference points, wherein, since road R2 extends in the X axis direction, the range of the respective areas of road R2 are determined on the basis of the X coordinate of the reference points of the respective areas as shown in FIG. 18B. Therefore, when a character C2 exists on road R2, the moving direction of the character C2 is obtained on the basis of the X coordinates where the character C2 exists at the present time and after it has moved, and the X coordinate of the reference points of road R2 in the respective areas.

In FIG. 17, boundaries of areas such as the road R1, the road R2 and the road R3 are shown by broken lines. As branching points for the road R1, the road R2 and the road R3, the data of the background image can be switched over between forward and backward for the road R1, the road R2 and the road R3, respectively, in correspondence to the area where the character C2 moves.

Figure 19A:
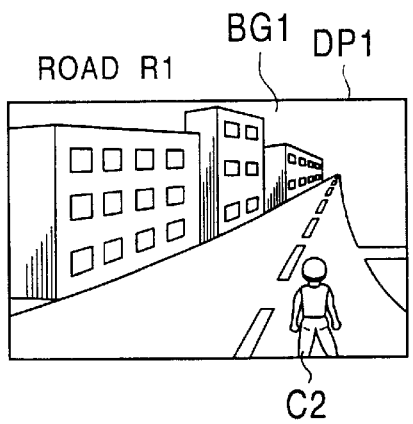
FIGS. 19A–19F illustrate an example of screen displays in movie-reproduction in the forward direction in accordance with embodiment 2.
Figure 19B:
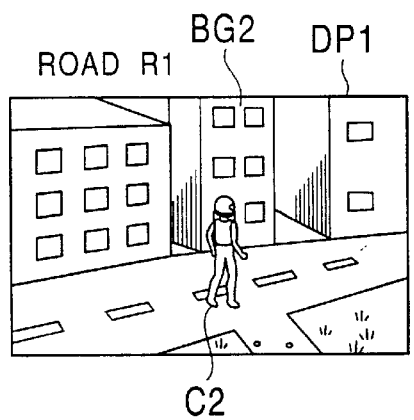

FIGS. 19A to 19F illustrate examples of displays on the screen of the output unit 30 in forward movie reproduction in embodiment 2. The two screen displays shown in FIGS. 19A and 19B are the results of synthesis with the first forward movie data 212d as the background image, and with the 2-D projected image obtained through 2-D transformation of the character C2 moving within the road R1, performed on the basis of a view point dependent on the first view point information table 213, as the background image.

Figure 19D:
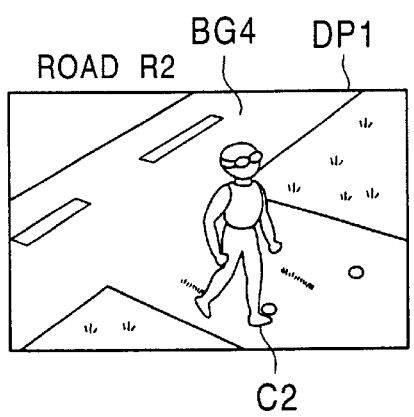
Figure 19C:
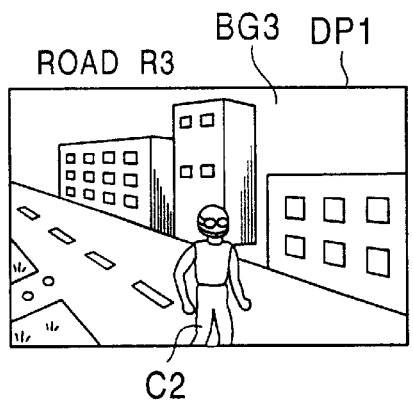
Figure 19E:
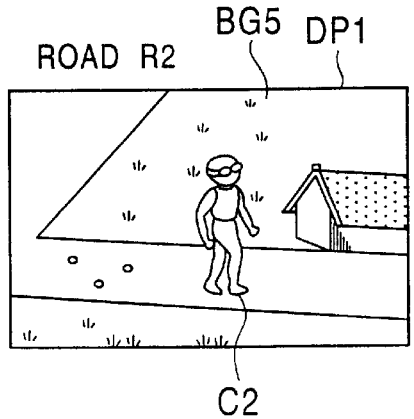
Figure 19F:
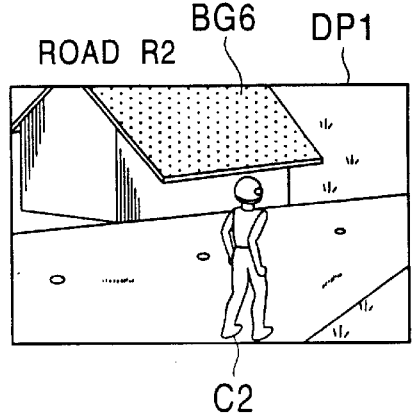

The screen display shown in FIG. 19C is the result of synthesis with the third forward movie data 212h as the background image, and with the 2-D projected image obtained through 2-D transformation of the character C2 moving within the road R3, performed on the basis of a view point dependent on the third view point information table 215, as the foreground image. The three screen displays shown in FIGS. 19D to 19F are the results of synthesis with the second forward movie data 212h as the background image, and with the 2-D projected image obtained through 2-D transformation of the character C2 moving within the road R2, performed on the basis of a view point dependent on the second view point information table 214, as the foreground image.

With reference to FIGS. 19A to 19F, operations of the player and actions of the present game apparatus 20 will be described. For example, in the case of the game scene shown in FIG. 19A, it is possible to cause the character C2 to advance within the road R1 (on the road), as in the screen transition changing in a sequence of FIGS. 19A to 19B, by keeping pressing the right direction button of the input unit 25 (steps S624 to S626 in FIG. 14, steps S607 to S609 in FIG. 13).

In this case, the first forward movie data 212d shown in FIGS. 19A and 19B are displayed on the screen DP1 as the background BG1<<BG2. When the player further keeps pressing the right direction button, it is possible to cause the character C2 to advance into the road R3 (on the road), as in the screen transition changing in a sequence of FIGS. 19B to 19C (steps S664 to S666 in FIG. 16, steps S607 to S609 in FIG. 13). At this point, the third forward movie data 212h are displayed on the screen DP1 as the background image BG3.

In the game scene shown in FIG. 19B, on the other hand, the player can, in the game scene as shown in FIG. 19B, transfer the character from the road R1 to the road R2 (on a gravel walk) and cause the character C2 to advance down the road R2 (on the gravel walk), as in the screen transition changing in a sequence of FIGS. 19B→19D→19E→9F (steps S644 to S646, steps S607 to S609 in the steps shown in FIG. 15). In this case, the second forward movie data 212f shown in FIGS. 19D, 19E and 19F are displayed on the screen DP1 as the background images BG4→BG5→BG6.

Figure 20A:
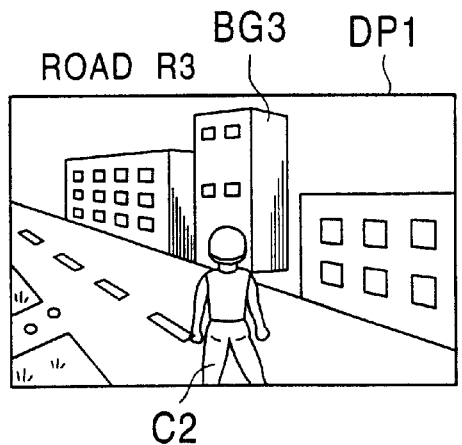
FIGS. 20A–20C illustrate an example of screen displays in movie-reproduction in the backward direction in accordance with embodiment 2.
Figure 20B:
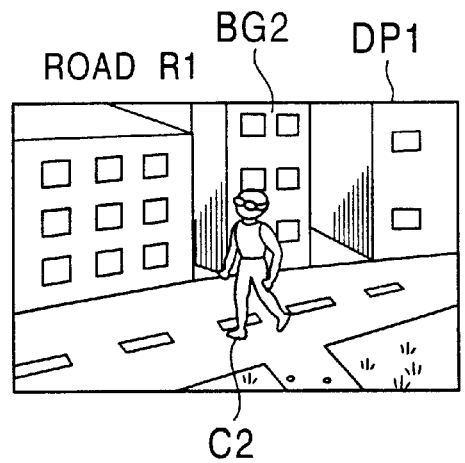
Figure 20C:
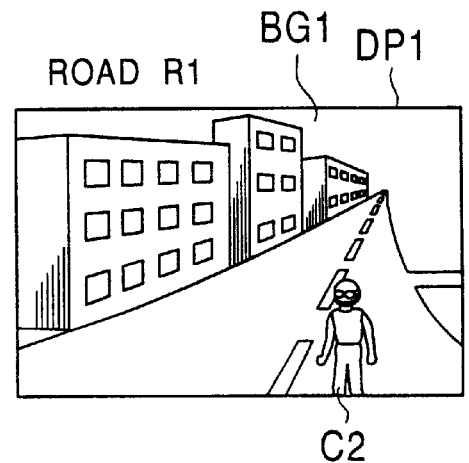

FIGS. 20A–20C illustrate an example of displays on the screen DP1 of the output unit 30 in backward movie reproduction. The player can cause the character C2 to go backward in the road R3 and the road R1 (on the roads) as in screen transition changing in a sequence of FIGS. 20A→20B→20C in a different direction of the character C2 by repeatedly pressing the left direction button of the input unit 25 (steps S667 to 669 in FIG. 16, steps S627 to S629 in FIG. 14, steps S607 to S609 in FIG. 13). In the display of FIGS. 20A→20B→20C corresponding to FIGS. 19C→19B→19A, the third and first backward movie data 212i and 212c are displayed on the screen DP1 as the background images BG3→BG2→BG1.

The player can cause the character C2 to go back in the road R2 (on the gravel walk) as in screen transition changing in a sequence of FIGS. 19F→19E→19D in a different direction of the character C2 by continuing to press the up button of the input apparatus 25 (steps S647 to S649 in FIG. 15, steps S607 to S609 in FIG. 13). It is also possible to bring the character C2 from the road R2 back to the road R1 (steps S627 to S629 in FIG. 14, steps S607 to S609 in FIG. 13), or to advance to the road R3 (steps S664 to S666 in FIG. 16, steps S607 to S609 in FIG. 13). In this case, as in the case shown in FIG. 20, the second backward movie data 212g are displayed on the screen DP1 as background images BG6→BG5→BG4.

According to embodiment 2, as described above, even when the character moves not only in the right/left direction but also in the up/down direction, background movie reproduction is performed in conjunction with these four directions. As a result, there is available image display including movie reproduction permitting free movement of the character, not only along a straight line, but also in a plurality of directions containing branching.

In embodiment 2, furthermore, two kinds (forward/backward) of movie data are used for each of the road 1, road 2 and road 3, but this is not limited. For example, one road may be formed by combining the road 1 and the road 3, or a road 4, a road 5 or more roads may be set, and two kinds (forward/backward) of movie data may be assigned to each road. That is, there is no limitation on the number of roads and the number of kinds of movie data so far as each road corresponds to two kinds (forward/backward) of movie data.

Embodiment 3

An embodiment 3 of the game apparatus of the present invention will now be described. Embodiment 3 represents a case where the present invention is applied to movie reproduction not relevant to movement of a character in a virtual 3-D space. Because embodiment 3 has the same configuration of the game apparatus and the game system as in embodiment 1 shown in FIG. 1, description is omitted here. Only points different from embodiment 1 will be described.

Figure 21A:
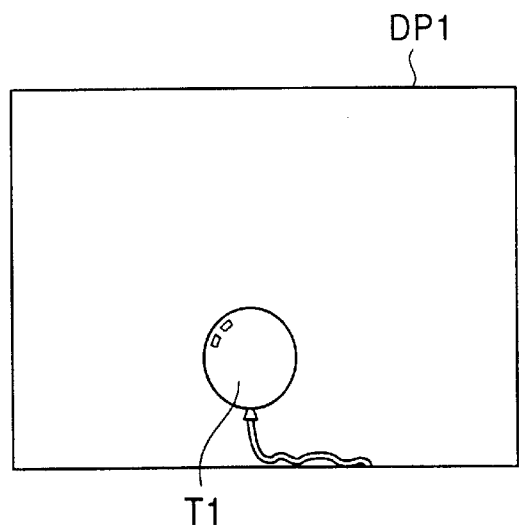
FIGS. 21A–21C illustrate an example of screen displays in movie-reproduction in the forward and backward direction in accordance with embodiment 3 of the invention.
Figure 21B:
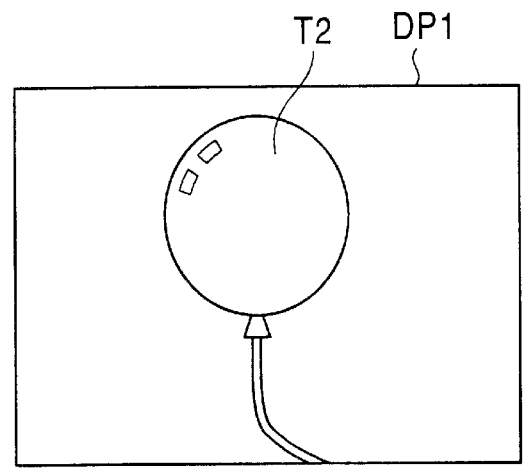
Figure 21C:
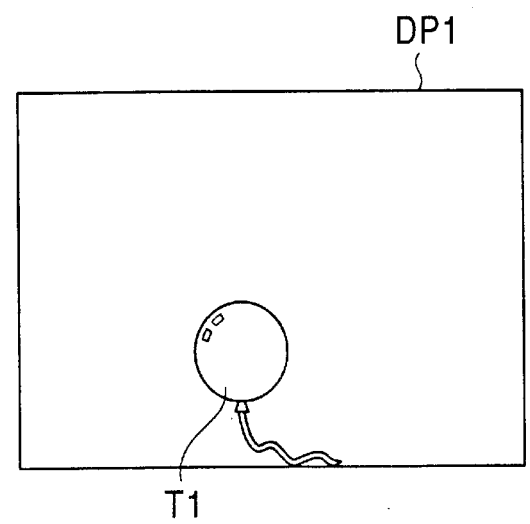

FIGS. 21A to 21C illustrate examples of display on the screen of the output unit 30 in forward and backward movie reproduction in embodiment 3. These examples represent a reversible depiction such as inflation and deflation of a balloon. That is, the invention is applied to depiction of the changing state of a balloon T1→T2→T1.

A deflated balloon T1, if filled with a gas such as helium, is gradually inflated into a balloon T2 as shown in FIG. 21B. FIGS. 21A and 21B illustrate changes in depiction of expansion and rise occurring along with the change from balloon T1 to T2. The movie data reproducing the change in depiction of expansion and rise (first stream) are called forward movie data. The inflated balloon T2 gradually contracts upon removal of the filling gas, and changes into the balloon T1 shown in FIG. 21C. The examples shown in FIGS. 21B and 21C illustrate changes in depiction of contraction and descent along with changes from balloon T2 to T1. The movie data reproducing the changes in depiction of contraction and descent (second stream) are called backward movie data. These forward and backward movie data, as in the example shown in FIG. 3, are recorded adjacent to each other on the same track of the CD-ROM 10, although they are not limited thereto. The terms forward and backward mean streams (directions) causing a change in depiction of the displayed image relative to the time axis representing the lapse of time.

According to embodiment 3, as described above, it is possible to reproduce a reversible change such as that of an object of which the condition changes along with the lapse of time in a stationary state.

The three embodiments of movie reproduction of the present invention have been described above. The invention is not however limited to these embodiments.

In embodiments 1 and 2, the movie reproduction of the invention is applied for the purpose of depicting changes in background resulting from movement of the character in a virtual 3-D space, and in embodiment 3, the movie reproduction is applied for the purpose of depicting changes in condition of an object. The movie reproduction of the invention is not limited to these applications.

For example, the invention is applicable also to an adventure game using a number of various kinds of movie data. That is, the invention is applicable to a game in which, in response to instructions from a player or the like, the direction of movie reproduction is reversed, or reproduction is performed while switching over a number of movies, and interactive and dynamic movie reproduction is required.

It is also possible to commonly use movie data by reading out movie data used in other scenes sequentially from any frame image and reproducing (or reversely reproducing) these data in a movie reproducing scene of an adventure game, thereby saving the amount of data to be stored in the CD-ROM.

In embodiments 1 and 2, the movie reproducing direction can be reversed on the basis of the moving direction of the character in response to an operational instruction from the player. Reversal of the reproducing direction is not, however, limited to such an explicit event. For example, when, during reproduction of movie in the forward direction in a partial area of the screen, an instruction is given to do a specific movement to the character displayed in another partial area of the screen, the movie reproducing direction may be reversed. It is also possible to draw a moving pattern by reversing the movie reproducing direction at random on the basis of generation of random numbers.

In embodiments 1 and 2, a reproducing direction of the movie is determined on the basis of positional (coordinates) data of the character, but this is not limited. For example, the movie reproducing direction may be switched over in conjunction with an instruction of the moving direction of the player to the character. That is, it suffices to switch over movie data to be reproduced by identifying the kind of direction button on the input unit 25.

In the embodiments described above, forward and backward movie data are recorded on the same track (in adjacent sectors) of the CD-ROM. The recording position is not, however, limited to this. It is not always necessary to record these two kinds of movie data in neighboring sectors so far as the time required for switching over for reading out these data does not impose an unnatural waiting time on the player. It suffices for recorded positions of frame images to be correlated in a certain manner with those of the other kind movie data.

In the embodiments shown, cases of application of the invention with a home game apparatus as the platform have been described. The invention may also be applied, using as the platform, a general-purpose computer such as a personal computer, an arcade game apparatus, or a communications terminal such as a portable telephone set, a portable information terminal or a car navigator.

In the embodiments presented above, a program or data for materializing the present invention is stored in a CD-ROM, and this CD-ROM is used as a recording medium. However, the recording medium is not limited to a CD-ROM, but it may be another computer-readable magnetic or optical medium, for example, a DVD-ROM.

According to the present invention, as described above, it is possible to control the stream of changes in the displayed image by changing over a stream of changes in depiction of the displayed image to another stream of changes, thereby permitting easy interactive change in the stream of changes in a moving picture in response to the progress of the game.

The present disclosure relates to subject matter contained in priority Japanese Patent Application No. 11-123258, filed on Apr. 30, 1999, the contents of which is herein expressly incorporated by reference in its entirety.

What is claimed is:

1. A game apparatus for displaying a player-operated object positioned within a virtual space and a background of the virtual space, the apparatus comprising:
   a computer that controls a game;
   a computer readable storage medium storing movie image data showing the background and a computer program that controls the computer, the movie image data comprising a plurality of streams, each stream being associated with a position in the virtual space;
   an input device that detects a desired direction of movement based upon manual input;
   a drive that reads image data from one of the plurality of streams corresponding to the desired direction of movement of the object within the virtual space; and
   a display that displays a series of images in accordance with the read image data;
   wherein when a new desired direction of movement is detected, a position of the object moved in accordance with the new desired direction of movement is calculated, and the displayed series of images is changed to a stream corresponding to the calculated position.

2. A method of reproducing a movie image showing a background of a virtual space in a video game, comprising:
   detecting a desired direction, of movement of the object in the virtual space based upon manual input;
   reading movie image data, corresponding to the desired direction of movement, the movie image data comprising a plurality of streams of movie image data, each stream being associated with a position within the virtual space;
   changing the movie image to be displayed in accordance with the read movie image data;
   when a new desired direction of movement is detected, calculating a position of the object moved in accordance with the new desired direction of movement; and
   changing the movie image to be displayed to the movie image corresponding to the calculated position.

3. The method of reproducing a movie image according to claim 2, wherein the reading of movie image data further comprises reading movie image data upon detection of a change of direction of movement; and
   wherein the changing further comprises changing said displayed movie image when said movie image data is read.

4. The method of reproducing a movie image according to claim 2, wherein the movie image data corresponding to a first stream forms a pair with movie image data corresponding to a second stream so that the change in depiction caused by said first stream returns to an original state.

5. The method of reproducing a movie image according to claim 4, wherein movie image data corresponding to any one of said first stream and said second stream are read when reading the movie image data.

6. The method of reproducing a movie image according to claim 4, wherein said movie image data are recorded on one side of an optical disk.

7. The method of reproducing a movie image according to claim 6, wherein said movie image data are for reproducing a background image.

8. The method of reproducing a movie image according to claim 7, wherein said background image is displayed superimposed over an image of an operation object; and
   wherein the detecting further comprises detecting a change of desired direction of the displayed image on the basis of the moving direction of said operation object in response to manual input from the player.

9. The method of reproducing a movie image according to claim 8, wherein said method further comprises switching a view point in correlation with the changing of desired direction, and changing the image of the operation object on said background image in accordance with the switched view point.

10. The method of reproducing a movie image according to claim 6, wherein said movie image data are for reproducing the process of a series of changes in an object to be displayed with a changing manner.

11. A recording medium recording a program for controlling display of a player-operated object positioned within a virtual space and a background of the virtual space, said recording medium storing a plurality of streams of movie image data, each stream being associated with a position in the virtual space, and a program for reproducing a movie image, said program causing said computer:

to detect a desired direction of movement of the object in the virtual space in response to manual input from a player;

to read movie image data corresponding to the detected desired direction of movement, the movie image data comprising a plurality of streams of movie image data, each stream being associated with a position within the virtual space;

to cause a change in said displayed movie image in accordance with the read movie image data;

when a new desired direction of movement is detected, to calculate a position of the object moved in accordance with the new desired direction of movement; and to change the movie image to be displayed to the movie image corresponding to the calculated position.

12. The recording medium according to claim 11, wherein said movie image data are read upon detection of the desired direction of movement; and said displayed image is changed upon reading the movie image.

13. The recording medium according to claim 11, wherein a movie image data stream corresponding to the first desired direction forms a pair with a movie image data stream corresponding to the second desired direction so that the change in depiction caused by the first stream returns to an original state.

14. The recording medium according to claim 13, wherein, when reading a movie image, a movie image corresponding to any one of said first stream and said second stream is read.

15. The recording medium according to claim 13, wherein said movie image data are recorded on one side of an optical disk.

16. The recording medium according to claim 15, wherein said movie image data are for reproducing a background image.

17. The recording medium according to claim 16, wherein said background image is displayed superimposed with the image of the object of operation; and wherein the detecting further comprises, detecting the change of desired direction of movement on the basis of a moving direction of said object of operation in response to manual input from the operator.

18. The recording medium according to claim 17, wherein the computer further switches over a view point in correspondence to the change of desired direction, and changes the image of the object of operation on said background image in accordance with the switched view point.

19. The recording medium according to claim 15, wherein said movie image are for reproducing the process of a series of changes in the object of display with a changing manner.

* * * * *

UNITED STATES PATENT AND TRADEMARK OFFICE
CERTIFICATE OF CORRECTION

PATENT NO. : 6,561,906 B2
DATED : May 13, 2003
INVENTOR(S) : A. Suzuki

It is certified that error appears in the above-identified patent and that said Letters Patent is hereby corrected as shown below:

<u>Title page,</u>
Item [56], References Cited, FOREIGN PATENT DOCUMENTS, "9-2006679" should be -- 9-200679 --.

<u>Column 24,</u>
Line 7, after "direction" delete ",".

<u>Column 26,</u>
Line 24, after "image" insert -- data --.

Signed and Sealed this

First Day of November, 2005

JON W. DUDAS
*Director of the United States Patent and Trademark Office*